United States Patent
Gosala et al.

(10) Patent No.: US 12,338,757 B2
(45) Date of Patent: Jun. 24, 2025

(54) INTEGRATION OF ELECTRIC HEATER INTO AFTERTREATMENT CATALYST THERMAL MANAGEMENT

(71) Applicant: Cummins Inc., Columbus, IN (US)

(72) Inventors: Dheeraj Bharadwaj Gosala, Columbus, IN (US); Avra Brahma, Fishers, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/268,176

(22) PCT Filed: Dec. 17, 2021

(86) PCT No.: PCT/US2021/064159
§ 371 (c)(1),
(2) Date: Jun. 16, 2023

(87) PCT Pub. No.: WO2022/133287
PCT Pub. Date: Jun. 23, 2022

(65) Prior Publication Data
US 2024/0295184 A1  Sep. 5, 2024

Related U.S. Application Data

(60) Provisional application No. 63/127,377, filed on Dec. 18, 2020.

(51) Int. Cl.
*F01N 3/20*  (2006.01)
*F01N 9/00*  (2006.01)

(52) U.S. Cl.
CPC .......... *F01N 3/2013* (2013.01); *F01N 9/002* (2013.01); *F01N 2900/08* (2013.01);
(Continued)

(58) Field of Classification Search
CPC .... F01N 3/2013; F01N 9/002; F01N 2900/08; F01N 2900/104; F01N 2900/1404; F01N 2900/1626
See application file for complete search history.

(56) References Cited

U.S. PATENT DOCUMENTS 5,570,576 A * 11/1996 Ament .................. F01N 3/2033
60/303
6,057,605 A   5/2000 Bourne et al.
(Continued)

FOREIGN PATENT DOCUMENTS

EP   3 192 991   7/2017

OTHER PUBLICATIONS

PCT International Search Report and Written Opinion for International Application No. PCT/US2021/064159 mailing date Mar. 21, 2022, 11 pages.

*Primary Examiner* — Matthew T Largi
(74) *Attorney, Agent, or Firm* — Foley & Lardner LLP

(57) ABSTRACT

A method for increasing a temperature of an exhaust gas to a target temperature is provided. The method includes determining, by a controller, a target energy of the exhaust gas and determining, by the controller, a target emissions based the target energy. The method further includes determining, by the controller, a tradeoff in a performance of an engine corresponding to one or more of the target emissions, an engine speed, and a driver demand power and determining, by the controller, an allowable heater power based on the tradeoff. The method further includes operating, by the controller, a heater with a heater power command not exceeding the allowable heater power to heat the exhaust gas to the target temperature.

20 Claims, 13 Drawing Sheets

(52) U.S. Cl.
CPC ............... *F01N 2900/104* (2013.01); *F01N 2900/1404* (2013.01); *F01N 2900/1626* (2013.01)

(56) References Cited

U.S. PATENT DOCUMENTS

| | | | |
|---|---|---|---|
| 8,473,177 | B2 | 6/2013 | Madurai Kumar et al. |
| 9,102,318 | B2 | 8/2015 | Yu et al. |
| 10,808,594 | B2* | 10/2020 | Dimoski ............. F02D 41/1445 |
| 2003/0145582 | A1 | 8/2003 | Bunting et al. |
| 2007/0245714 | A1* | 10/2007 | Frazier .................. F01N 3/208 |
| | | | 60/276 |
| 2008/0295493 | A1 | 12/2008 | Applegate et al. |
| 2010/0300083 | A1 | 12/2010 | Uemoto |
| 2011/0146270 | A1* | 6/2011 | Guo .................... F02D 41/1448 |
| | | | 60/285 |
| 2012/0173062 | A1* | 7/2012 | Madurai Kumar ... B60W 20/13 |
| | | | 903/903 |
| 2014/0041368 | A1 | 2/2014 | Stavrianos et al. |
| 2017/0159581 | A1 | 6/2017 | McCarthy et al. |
| 2018/0003118 | A1 | 1/2018 | Zur Loye et al. |
| 2019/0118794 | A1 | 4/2019 | Slottskog et al. |
| 2019/0155230 | A1* | 5/2019 | Culbertson ............. F01N 3/208 |
| 2019/0162102 | A1* | 5/2019 | Bevan .................. F01N 3/0821 |
| 2019/0234367 | A1* | 8/2019 | Pursifull ............. F02D 41/0002 |
| 2019/0360415 | A1* | 11/2019 | Romanato ............. F02D 41/405 |
| 2022/0025805 | A1* | 1/2022 | Webb ..................... F01N 3/208 |

* cited by examiner

INTEGRATION OF ELECTRIC HEATER INTO AFTERTREATMENT CATALYST THERMAL MANAGEMENT

CROSS-REFERENCE TO RELATED APPLICATION

This application is a National Phase based on PCT Application No. PCT/US2021/064159, filed Dec. 17, 2021, titled "INTEGRATION OF ELECTRIC HEATER INTO AFTERTREATMENT CATALYST THERMAL MANAGEMENT" which claims the benefit of and priority to U.S. Provisional Application No. 63/127,377, filed Dec. 18, 2020, titled "INTEGRATION OF ELECTRIC HEATER INTO AFTERTREATMENT CATALYST THERMAL MANAGEMENT", both of which are incorporated herein by reference in their entireties.

TECHNICAL FIELD

The present disclosure relates generally to reducing harmful emissions from an engine.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply.

In this regard, exhaust gas may contain harmful constituents (e.g., nitrous oxides ($NO_x$), sulfur oxides, particulate matter, etc.). Accordingly, the use of exhaust aftertreatment systems with engines to reduce harmful emissions is increasing. Exhaust aftertreatment systems may contain one or more catalysts that react with the exhaust gas to convert the harmful constituents to less harmful elements that are then released to the environment. Increasing catalytic activity is therefore important in reducing the amount of harmful emissions. Increasing catalytic activity may be achieved by, for example, increasing a temperature of the catalyst. Increasing catalyst temperature may promote intended operation of the catalyst (e.g., reducing $NO_x$ to less harmful compounds).

SUMMARY

One embodiment relates to a method for increasing a temperature of an exhaust gas to a target temperature. The method includes determining, by a controller, a target energy of the exhaust gas and determining, by the controller, a target emissions based the target energy. The method further includes determining, by the controller, a tradeoff in a performance of an engine corresponding to one or more of the target emissions, an engine speed, and a driver demand power and determining, by the controller, an allowable heater power based on the tradeoff. The method further includes operating, by the controller, a heater with a heater power command not exceeding the allowable heater power to heat the exhaust gas to the target temperature.

Another embodiment relates to a method for increasing a temperature of an exhaust gas to a target temperature. The method includes determining, by a controller, an allowable warm up time for a catalyst to reach a target temperature and determining, by the controller, total required exhaust power of the exhaust gas. The method further includes determining a target emissions based on one or more of the allowable warmup time and the exhaust target power and determining, by the controller, a tradeoff in a performance of an engine corresponding to one or more of the target emissions, an engine speed, and a driver demand power. The method further includes determining, by the controller, an allowable heater power based on the tradeoff and operating, by the controller, a heater with a heater power command not exceeding the allowable heater power to heat the exhaust gas to the target temperature.

Another embodiment relates to a method for maintaining a temperature of an exhaust gas within a predetermined range. The method includes determining, by a controller, a total required exhaust power of the exhaust gas to maintain the temperature of the exhaust gas, and determining, by the controller, a tradeoff in fuel consumption of an engine corresponding to one or more of the total required exhaust power, an engine speed, and a driver demand power. The method further includes determining, by the controller, an allowable heater power based on the tradeoff and operating, by the controller, a heater with a heater power command not exceeding the allowable heater power to maintain the temperature of the exhaust gas.

Another embodiment relates to a system for increasing a temperature of an exhaust gas in a vehicle system with an engine. The system includes an aftertreatment system coupled to the engine and an aftertreatment system heater in communication with the aftertreatment system. A controller is in communication with the engine and the aftertreatment system heater and comprises a processor coupled to a non-transitory memory storing instructions that, when executed by the processor, cause the processing circuit to perform operations. The operations include determining a target energy of the exhaust gas, determining a target emissions based on the target energy, and determining a tradeoff in a performance of an engine corresponding to one or more of the target emissions, an engine speed, and a driver demand power. The operations further include determining an allowable heater power based on the tradeoff and operating a heater with a heater power command not exceeding the allowable heater power to heat the exhaust gas to the target temperature or maintain the exhaust gas at the target temperature.

Another embodiment relates to a method for recovering kinetic energy of a vehicle. The method includes operating an aftertreatment system heater of an aftertreatment system at, or below, a heater power limit when the vehicle is braking or decelerating. The method further includes converting a portion of a recovered kinetic energy to thermal energy which is transferred to the aftertreatment system, the recovered kinetic energy generated when the vehicle is braking or decelerating. In response to an exhaust gas being at a target temperature, the transferred thermal energy is used to maintain the exhaust gas at the target temperature. In response to the exhaust gas being below the target temperature, the transferred thermal energy is used to increase the exhaust gas to the target temperature.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional

DETAILED DESCRIPTION

Figure 1:
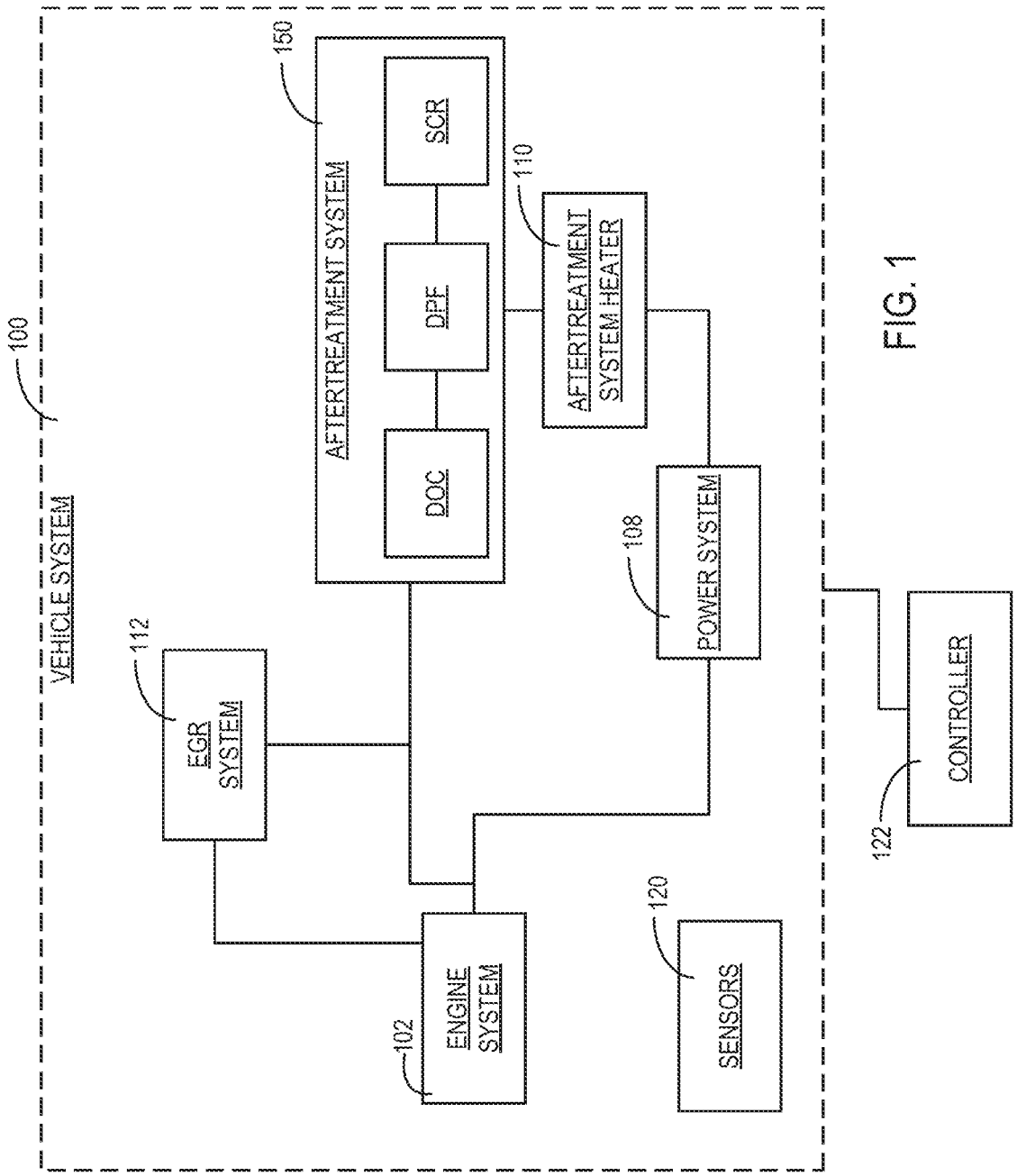
FIG. 1 is an illustration of a controller coupled to an engine system, according to an exemplary embodiment.

Following below are more detailed descriptions of methods, apparatuses, and systems for reducing harmful emissions from an engine. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

During engine operation, various harmful emissions are released into the environment via the exhaust gas from the engine. Many vehicles include an aftertreatment system configured to reduce the amount of these emissions. An aftertreatment system can include one or more of a selective catalytic reduction ("SCR") system, a diesel oxidation catalyst ("DOC"), and a diesel particulate filter ("DPF"). An SCR system converts nitrogen oxides ($NO_x$) into nitrogen and water, thereby reducing the amount of $NO_x$ released to the environment. A DOC converts hydrocarbons and carbon monoxide into carbon dioxide and water, thereby reducing the amount of hydrocarbons and carbon monoxide released to the environment. SCR systems and DOCs are most effective when the catalyst bed temperature is at or above a threshold (e.g., approximately 200° Celsius ("C")). Higher exhaust gas temperatures heat the catalysts of the SCR system and the DOC to promote catalyst activity, which results in intended operation of these catalysts to reduce harmful emissions from the engine. A DPF is configured to capture particulate matter, thereby reducing the amount of particulate matter (e.g., soot, etc.) released to the environment. Because the DPF captures particulate matter, the DPF must be cleaned on a routine basis to avoid clogging. Typically, cleaning the DPF requires increasing the temperature of the exhaust gas to at least 450° C. to burn the accumulated particulate matter.

There are various instances during operation of an engine when the temperature of the exhaust gas is too low for the various aftertreatment systems to be effective. Those instances include, but are not limited to, starting with a cold engine and catalyst (e.g., "cold start," "cold start cycle," "cold start mode," "warm up mode"), operating the engine at low speed immediately after starting the engine, operating the engine in a cold environment, etc. (e.g., "cold conditions"), and operating the engine at low loads for an extended duration. Emissions generated during a cold start cycle of a certification process can contribute emissions that amount to greater than sixty percent of the overall emissions of the engine. Furthermore, the emissions generated while the catalyst is cold may amount to over ninety percent of the emissions generated in a cold start cycle. Among other applications, the systems and methods described herein are configured to increase the temperature of the exhaust gas during such instances to reduce harmful emissions that would otherwise be released to the environment.

According to the present disclosure, methods, apparatuses, and systems are disclosed that increase the temperature of exhaust gas from an engine to promote exhaust aftertreatment system catalytic activity. These systems include, but are not limited to, aftertreatment system heaters.

Aftertreatment system heaters can be added to a conventional aftertreatment system. An aftertreatment system heater is configured to increase the temperature of the exhaust gas to either 1) raise the temperature of the exhaust gas to at least 200° C. to promote catalyst activity in the aftertreatment system, or 2) further elevate the temperature of the exhaust gas to increase the effectiveness of the aftertreatment system. A variety of electric heaters may be present in an aftertreatment system, placed upstream of different catalyst elements (e.g., the DOC, SCR, etc.) or embedded in the catalyst elements themselves. The aftertreatment system heater(s) may be powered directly from the engine via a generator (e.g., a motor-generator) or may draw power from a battery or any other energy storage system if one is present. The battery may replenish itself using engine power or draw power from an external electrical source. In almost all of these cases, providing power to the aftertreatment system heater tends to alter engine operation (e.g., greater fuel consumption, higher amounts of $NO_x$ being released, etc.) than when power is not provided to the aftertreatment system heater (e.g., the aftertreatment system heater is not operating). However, the difference in engine operation must be balanced against the inefficiency of the engine in providing the thermal power required to heat the catalyst to the threshold temperature or to maintain heat in the catalyst. The aftertreatment system heater is used to a point where the balance remains favorable. For example, the aftertreatment system heater is powered as long as the gain in efficiency from the increased exhaust temperature outweighs the loss in efficiency from the change in engine operation resulting from operation of the aftertreatment system heater.

According to the present disclosure and as described in more detail herein, a system and method of operating an engine system based on various operating conditions of the engine system is utilized to reduce unwanted emissions. A controller is coupled to an aftertreatment system heater, the engine, and other components of the system. In operation, the controller utilizes sensors to determine or estimate an engine emissions level and a temperature of exhaust gas to determine whether to provide power to an aftertreatment system heater to increase the exhaust gas temperature, and how much power to provide. Based on a comparison of an efficiency of the engine and the power provided to the engine and the aftertreatment system heater, the controller may alter/change the power provided to the aftertreatment system heater to increase one of the efficiency of the engine or the temperature of the exhaust gas.

The systems and methods disclosed herein allow the controller to determine the required electric heater power to increase the exhaust temperature to a determined level in a cold start mode (e.g., cold ambient temperature, starting the engine after not being operational for a specified duration, etc.), and to determine the required power to maintain the exhaust temperature after the engine is warm ("stay warm mode"). In some embodiments, the controller manages the trade-offs between increasing exhaust temperature, engine emissions ($NO_x$, particulate matter ("PM")), and fuel consumption in various engine modes (cold start, stay warm, etc.) based on various conditions. The conditions may include driver demand power (e.g., the power required by the driver based on road and/or driving conditions), a state of charge of the power system (e.g., the level of power available for use by the engine and the aftertreatment system heater), vehicle speed, and engine speed.

It should be understood that while the description and Figures herein are primarily directed to systems and methods to reduce emissions by operating various systems within a vehicle, this description is not meant to be limiting. The systems and methods described herein are also applicable to accomplish other effects within a vehicle.

Referring now to FIG. 1, an illustration of a controller 122 coupled to the vehicle 100 is shown, according to an exemplary embodiment. The vehicle 100 may include an on-road or an off-road vehicle including, but not limited to, line-haul trucks, mid-range trucks (e.g., pick-up trucks), cars, boats, tanks, airplanes, locomotives, mining equipment, and any other type of vehicle that may utilize systems to reduce emissions. The vehicle 100 may include a powertrain system, a fueling system, an operator input/output device, one or more additional vehicle subsystems, etc. The vehicle 100 may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

The engine system 102 is structured as a compression-ignition internal combustion engine that utilizes diesel fuel. However, in various alternate embodiments, the engine system 102 may be structured as any other type of engine (e.g., spark-ignition) that utilizes any type of fuel (e.g., gasoline, natural gas). In still other example embodiments, the engine system 102 may be or include an electric motor (e.g., a hybrid drivetrain). The engine system 102 includes one or more cylinders and associated pistons. Air from the atmosphere is combined with fuel, and combusted, to power the engine system 102. Combustion of the fuel and air in the compression chambers of the engine system 102 produces exhaust gas that is operatively vented to an exhaust pipe and to the aftertreatment system.

The vehicle 100 is shown to include the engine system 102, a power system 108, an aftertreatment system heater 110 coupled to an aftertreatment system 150, an exhaust gas recirculation ("EGR") system 112, and sensors 120.

The power system 108 can include one or more of a battery and a motor-generator and is configured to provide electrical power to various systems and components in a vehicle that require electrical power. As used herein the term "motor-generator" refers to a device used to convert power from one form to another. In an example embodiment, the motor-generator is an alternator that converts mechanical energy from the engine to electrical energy that can be used by the aftertreatment system heater 110 and other devices. In embodiments that include both a battery and a motor-generator, the motor-generator provides electrical power to the battery via an electrical bus (e.g., a system that couples the various electrical components and allows electrical power to be transferred between the electrical components) by drawing power from the engine. The motor-generator may also consist of a motor function that may provide traction assist to the engine using energy from the battery. The battery may be configured to provide power to the various systems and components (e.g., the aftertreatment system heater 110) when the vehicle is on (e.g., the engine system 102 is running) and when the vehicle is off (e.g., the engine system 102 is not running). The motor-generator may also be configured to provide power to the various electrical systems and components when the vehicle is on. The motor-generator may also be configured to charge the battery when the vehicle is under positive traction, or to recover the vehicle kinetic energy when the vehicle is braking.

The power available in the battery and the motor-generator can be determined based on a variety of factors. For example, the battery has a maximum charge level (e.g., the maximum amount of power that can be stored) and an actual charge level (e.g., the amount of power stored at a given time). In some embodiments, the actual charge level can be a percentage of the maximum charge level. The actual charge level relative to the maximum is known as the state of charge (SOC). During operation of the vehicle, the actual charge level of the battery varies as the vehicle 100 consumes power. The power available in the motor-generator is determined based on the amount of power the motor-generator draws from its power source (e.g., the battery and/or the engine). During operation of the vehicle, the power available in the motor-generator varies as battery power and engine load vary. For example, the aftertreatment system heater 110 uses power from either the battery or the motor-generator via the electrical bus to increase the temperature of the exhaust gas. Each of the systems comprising the vehicle 100 has a threshold level of power required for the system to operate. If the SOC of the battery and the motor-generator is lower than the threshold level of power, the system cannot operate. For example, the aftertreatment system heater 110 may require a certain SOC (e.g., at least 50%) to heat exhaust gas to a desired temperature. If the actual SOC of the battery exceeds the threshold level (e.g., the SOC is greater than or equal to 50%), the aftertreatment system heater 110 can operate. If, on the other hand, the SOC of the battery and the motor-generator is lower than the threshold power level (e.g., the SOC is less than 50%), the aftertreatment system heater 110 cannot operate. In instances where the aftertreatment system heater 110 cannot operate based on the SOC of the battery, the motor-generator may supplement the electrical power by drawing mechanical power from the engine.

As another example, a temperature of the battery and/or the motor-generator may indicate the amount of power available. If the temperature of the battery and/or the motor-generator is lower than a minimum threshold temperature, the amount of power available may be low. In addition, if the temperature of the battery and/or the motor-generator is higher than a maximum threshold temperature, the amount of power may be low. Accordingly, the temperature of the battery and/or the motor-generator may need to be within a target temperature range to provide sufficient power.

The aftertreatment system heater 110 is coupled to the aftertreatment system 150 and is configured to increase the temperature of the exhaust gas flowing through the aftertreatment system 150. Raising the temperature of the exhaust gas with the aftertreatment system heater 110 increases the efficiency of one or more catalysts of the aftertreatment system. The aftertreatment system heater 110 may be a grid heater, a heater within the SCR system, an induction heater, or a microwave heater.

A grid heater may include an electrically conductive mesh structure configured to fit within the flow of the exhaust gas that allows the exhaust gas to flow through the mesh structure. The mesh structure can be, for example, a resistive heater that increases in temperature when coupled to an electric power source (e.g., the power system 108). The grid heater heats the gas, which in turn transfers heat to a catalyst of the aftertreatment system 150. As the exhaust gas flows through the grid heater, the temperature of the exhaust gas increases via convection.

A heater within the SCR system may include an electric heater embedded within, or otherwise coupled to, the catalyst substrate. The electric heater may be a resistive heater or any other type of suitable electric heater capable of heating the exhaust gas as it flows through the SCR system.

An induction heater may include an electrically conductive structure configured to fit within the flow of the exhaust gas that allows the exhaust gas to flow through or around the structure. The structure is coupled to an electromagnet connected to a power source. The power source induces a high-frequency alternating current through the electromagnet, which generates current through the structure, causing the structure to heat up. As exhaust gas flows through the structure, the temperature of the exhaust gas increases via convection.

A microwave heater may include an electromagnetic radiation source in communication with the exhaust gas. The electromagnetic radiation source may rapidly vary electric and magnetic fields, causing the exhaust gas to increase in temperature.

In various instances, the temperature of the air entering the cylinders of the engine system 102 may be below a threshold temperature such that the temperature of the exhaust gas is too low (e.g., below 200° C.) for the aftertreatment system 150 to remove harmful emissions. In other instances, an amount of harmful emissions reduced or eliminated is below a threshold level (e.g., the aftertreatment system 150 is not operating as efficiently as desired). In such instances, the aftertreatment system heater 110 can be activated to heat the exhaust gas, thereby increasing the temperature of the exhaust gas. The aftertreatment system heater 110 draws power from the power system 108 to heat the exhaust gas. As the aftertreatment system heater 110 draws more power from the power system 108, the temperature of the exhaust gas can increase at a faster rate. For example, if the temperature of the exhaust gas must increase quickly, the aftertreatment system heater 110 may draw a relatively large proportion (e.g., greater than fifty percent) of the available power from the power system 108 to quickly heat the exhaust gas. If the temperature of the exhaust gas may increase slowly, the aftertreatment system heater 110 may draw a relatively small proportion (e.g., up to ten percent) of the available power from the power system 108 to slowly heat the exhaust gas. After the exhaust gas reaches a target temperature (e.g., a temperature greater than the threshold temperature by a certain amount), the aftertreatment system heater 110 may be turned off or the power directed to the aftertreatment system heater 110 may be reduced to maintain the exhaust gas at the target temperature.

The EGR system 112 coupled to the engine system 102 and the aftertreatment system 150 and is configured to direct a portion of the exhaust gas back into the cylinders of the engine system 102, where the exhaust gas is mixed with air from the intake system for combustion. The EGR system 112 operates to reduce the combustion temperature in the cylinders by diluting the amount of oxygen from the intake system. The reduction in combustion temperature reduces the exhaust temperature, which reduces $NO_x$ formation from combustion. In various embodiments, the engine system 102 includes an EGR bypass valve that can be positioned in an open configuration and a closed configuration. In the open configuration, the EGR bypass valve directs at least a portion of the exhaust gas back to the cylinders of the engine system 102, as described. In the closed configuration, the EGR bypass valve directs all of the exhaust gas to the aftertreatment system 150 without going back through the cylinders.

The sensors 120 are coupled to the controller 122 and to one or more of the systems of the vehicle 100. The sensors are configured to detect and/or determine values associated with various properties of the vehicle 100. Accordingly, the sensors 120 may include one or more of a temperature sensor (e.g., a thermocouple, a resistance temperature detector, etc., to determine a temperature of the exhaust gas), a particulate matter sensor (e.g., to determine the amount of particulate matter in the exhaust gas), an emission sensor (e.g., to determine a proportion of oxygen and nitrous oxides in the exhaust gas, which is indicative of the level of harmful emissions in the exhaust gas and thus the efficiency of the engine), a power sensor (e.g., a voltmeter), a vibration sensor, and a noise sensor. In some embodiments, the sensors 120 are combined into a single sensor. In some embodiments, the sensors 120 are separate sensors. In some embodiments, a plurality of sensors (e.g., a plurality of temperature sensors, a plurality of particulate matter sensors, and/or a plurality of emission sensors) may be used.

The controller 122 is coupled to the vehicle 100 and is configured to at least partly control the operation of the vehicle 100. The controller 122 is further described with reference to FIG. 2.

Figure 2:
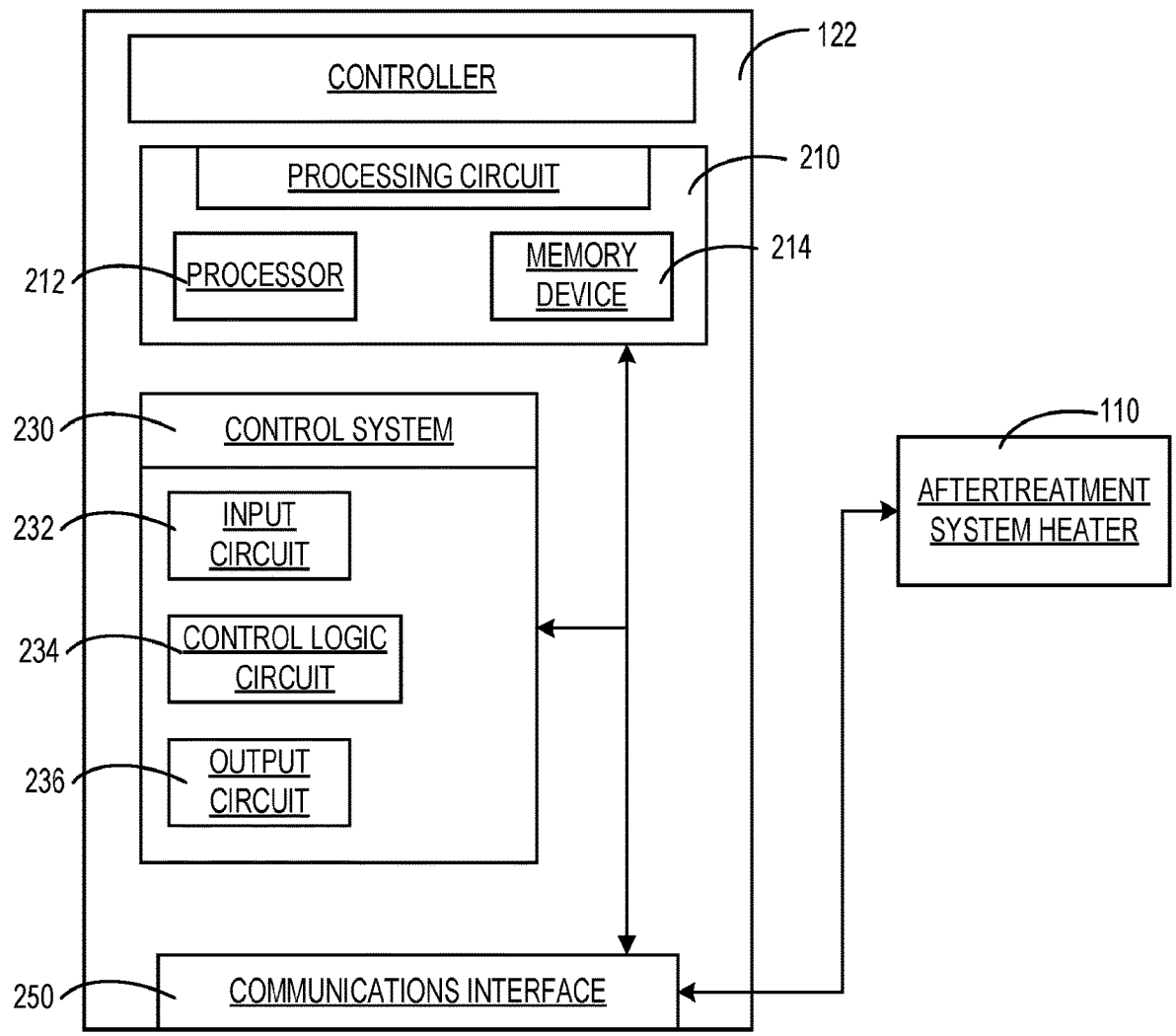
FIG. 2 is a schematic diagram of the controller of FIG. 1, according to an exemplary embodiment.

FIG. 2 is a schematic diagram of the controller 122 of FIG. 1, according to an exemplary embodiment. The controller 122 is structured to receive inputs (e.g., signals, information, data, etc.) from the vehicle 100. Thus, the controller 122 is structured to control, at least partly, the vehicle 100. As the components of FIG. 2 can be embodied in a vehicle, the controller 122 may be structured as one or more electronic control units (ECU). The controller 122 may be separate from or included with at least one of a transmission control unit, an exhaust aftertreatment control unit, a powertrain control module, an engine control module, etc.

As shown, the controller 122 includes a processing circuit 210 having a processor 212 and a memory device 214, a control system 230 having an input circuit 232, a control logic circuit 234, an output circuit 236, and a communications interface 250.

In one configuration, the input circuit 232, the control logic circuit 234, and the output circuit 236 are embodied as machine or computer-readable media that stores instructions that are executable by a processor, such as processor 212 and stored in a memory device, such as memory device 214. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 232, the control logic circuit 234, and the output circuit 236 are embodied as hardware units, such as electronic control units. As such, the input circuit 232, the control logic circuit 234, and the output circuit 236 may be embodied as one or more circuitry components including, but not limited to, processing circuitry, network interfaces, peripheral devices, input devices, output devices, sensors, etc. In some embodiments, the input circuit 232, the control logic circuit 234, and the output circuit 236 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input circuit 232, the control logic circuit 234, and the output circuit 236 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input circuit 232, the control logic circuit 234, and the output circuit 236 may also include programmable hardware devices such as field programmable gate arrays, programmable array logic, programmable logic devices or the like. The input circuit 232, the control logic circuit 234, and the output circuit 236 may include one or more memory devices for storing instructions that are executable by the processor(s) of the input circuit 232, the control logic circuit 234, and the output circuit 236. The one or more memory devices and processor(s) may have the same definition as provided below with respect to the memory device 214 and processor 212. In some hardware unit configurations, the input circuit 232, the control logic circuit 234, and the output circuit 236 may be geographically dispersed throughout separate locations in, for example, a vehicle. Alternatively and as shown, the input circuit 232, the control logic circuit 234, and the output circuit 236 may be embodied in or within a single unit/housing, which is shown as the controller 122.

In the example shown, the controller 122 includes the processing circuit 210 having the processor 212 and the memory device 214. The processing circuit 210 may be structured or configured to execute or implement the instructions, commands, and/or control processes described herein with respect to the input circuit 232, the control logic circuit 234, and the output circuit 236. The depicted configuration represents the input circuit 232, the control logic circuit 234, and the output circuit 236 as machine or computer-readable media that may be stored by the memory device. However, as mentioned above, this illustration is not meant to be limiting as the present disclosure contemplates other embodiments where the input circuit 232, the control logic circuit 234, and the output circuit 236, or at least one circuit of the input circuit 232, the control logic circuit 234, and the output circuit 236, is configured as a hardware unit. All such combinations and variations are intended to fall within the scope of the present disclosure.

The processor 212 may be a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Accordingly, the processor 212 may be a microprocessor, a different type of processor, or state machine. The processor 212 also may be implemented as a combination of computing devices, such as a combination of a DSP and a microprocessor, a plurality of microprocessors, one or more microprocessors in conjunction with a DSP core, or any other such configuration. In some embodiments, the processor 212 may be two or more processors that may be shared by multiple circuits (e.g., the input circuit 232, the control logic circuit 234, and the output circuit 236 may comprise or otherwise share the same processor which, in some example embodiments, may execute instructions stored, or otherwise accessed, via different areas of memory). Alternatively or additionally, the processors may be structured to perform or otherwise execute certain operations independent of the other co-processors. In other example embodiments, the processors may be coupled via a bus to enable independent, parallel, pipelined, or multi-threaded instruction execution. All such variations are intended to fall within the scope of the present disclosure.

The memory device 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 214 may be coupled to the processor 212 to provide computer code or instructions to the processor 212 for executing at least some of the processes described herein. Moreover, the memory device 214 may be or include tangible, non-transient volatile memory or non-volatile memory. Accordingly, the memory device 214 may include database components, object code components, script components, or any other type of information structure for supporting the various activities and information structures described herein.

The input circuit 232 is structured to receive information from the vehicle 100 via the communications interface 250. In some arrangements, the information generated by the vehicle 100 is sent to the control logic circuit 234 wirelessly (e.g., the sensors include a wireless transmitter to transmit information and the control logic circuit 234 includes a wireless receiver to receive the information). The information generated by the vehicle 100 can also be sent to the control logic circuit 234 via a wired connection. The input circuit 232 may modify or format the sensor information (e.g., via analog/digital converter) so that the sensor information can be readily used by the control logic circuit 234. In some embodiments, the sensor information may include the temperature of the exhaust gas. In some embodiments, the sensor information may include an amount of particulate matter present in the exhaust gas. In some embodiments, the sensor information may include an amount of oxygen present in the exhaust gas. In some embodiments, the sensor information may include a SOC or temperature of one or more components of the power system 108.

The control logic circuit 234 is structured to receive information regarding the vehicle 100 from the input circuit 232 and to determine one or more operation strategies based on the information. For example, the control logic circuit 234 can determine whether the aftertreatment system heater 110 should operate to increase the temperature of the exhaust gas and how much power to allocate to the aftertreatment system heater 110 from the power system 108 to increase the temperature of the exhaust gas to the desired temperature. As used herein, "control parameters" refer to values or information determined within the control logic circuit 234 by the embedded control logic, model, algorithm, or other control scheme. The control parameters may include values or information that represents a status or a state of a vehicle system, a predictive state information, or any other values or information used by the control logic circuit 234 to determine what the controller 122 should do or what the outputs should be.

For an aftertreatment system heater (e.g., the aftertreatment system heater 110), a complex control scheme balances requirements to 1) meet a requested exhaust gas temperature within a specified duration (e.g., catalyst warmup), 2) maintain engine out emissions and fuel consumption at acceptable levels during cold starts, and 3) maintain engine performance at a suitable efficiency based on an engine load. In order to control the technology to meet these requirements, "control parameters" are utilized to monitor the current state of the components. Control parameters refer to engine operating conditions (e.g., engine load, fuel efficiency, power consumption, etc.) and/or aftertreatment system heater operating conditions (e.g., temperature of exhaust gas, power consumption, etc.).

In some embodiments, the control logic circuit 234 includes algorithms or traditional control logic (e.g., PIDs, etc.). In some embodiments, the control logic circuit 234 includes modelling architecture for component integration or other model based logic (e.g., physical modelling systems that utilize lookup tables). In some embodiments, the control logic circuit 234 utilizes one or more lookup tables stored in the memory device 214 for determination of the control parameters. In some embodiments, the control logic circuit 234 may include artificial intelligence or machine learning circuits, or fuzzy logic circuits, as desired. In one embodiment, the control logic circuit 234 may receive a request related to increasing the temperature of the exhaust gas, and determine a control parameter in the form of allocating power to an aftertreatment system heater.

The output circuit 236 is structured to receive the control parameters from the control logic circuit 234 and provide power information (e.g., the "output") to the vehicle 100 via the communications interface 250. In some embodiments, the output circuit 236 receives a threshold exhaust gas temperature from the control logic circuit 234 and outputs a signal to the power system 108 to allocate an amount of power to the aftertreatment system heater 110 if the actual exhaust gas temperature is less than the threshold exhaust gas temperature.

According to various embodiments, the temperature of the exhaust gas may be determined by direct measurement or by proxy based on various operating parameters of the vehicle 100. To measure the temperature of the exhaust gas via direct measurement, one or more of the sensors 120 (e.g., thermocouples, etc.) coupled to the controller 122 may be placed in, on, or near the flow of the exhaust gas. Locations of the one or more sensors 120 can include, but are not limited to, at the inlet and/or outlet of the SCR system, at the inlet and/or outlet of the DPF, at the inlet and/or outlet of the DOC, and any other location that may provide the ability to directly measure the temperature of the exhaust gas. To determine or predict the temperature of the exhaust gas, the temperature of the exhaust gas may be estimated or determined by the controller 122 based on operating parameters such as the engine speed, the engine torque, and any other parameters associated with the engine system that may indicate the temperature of the exhaust gas (e.g., via one or more look-up tables, algorithms, etc. that correlate one or more operating parameters to exhaust gas temperature).

According to various embodiments, the available power may be determined by direct measurement or by proxy based on various operating parameters of the vehicle 100. To measure the available power via direct measurement, one or more of the sensors 120 (e.g., voltmeter, etc.) coupled to the controller 122 may be placed in, on, or near the power system 108 or other parts of the vehicle. To determine or predict the available power, the available power may be estimated or determined by the controller 122 based on operating parameters such as engine speed, the engine torque, and any other parameters associated with the engine system that may indicate the available power in the vehicle 100 (e.g., via one or more look-up tables, algorithms, etc. that correlate one or more operating parameters to the available power).

According to various embodiments, the level of emissions in the exhaust gas may be determined by direct measurement or by proxy based on various operating parameters of the vehicle 100. To measure the level of emissions in the exhaust gas via direct measurement, one or more of the sensors 120 (e.g., particulate matter sensors, etc.) coupled to the controller 122 may be placed in, on, or near the flow of the exhaust gas. To determine or predict the level of emissions in the exhaust gas, the level of emissions in the exhaust gas may be estimated or determined by the controller 122 based on operating parameters such as the engine speed, the engine torque, and any other parameters associated with the engine system that may indicate the level of emissions in the exhaust gas (e.g., via one or more look-up tables, algorithms, etc. that correlate one or more operating parameters to particulate matter).

Figure 3:
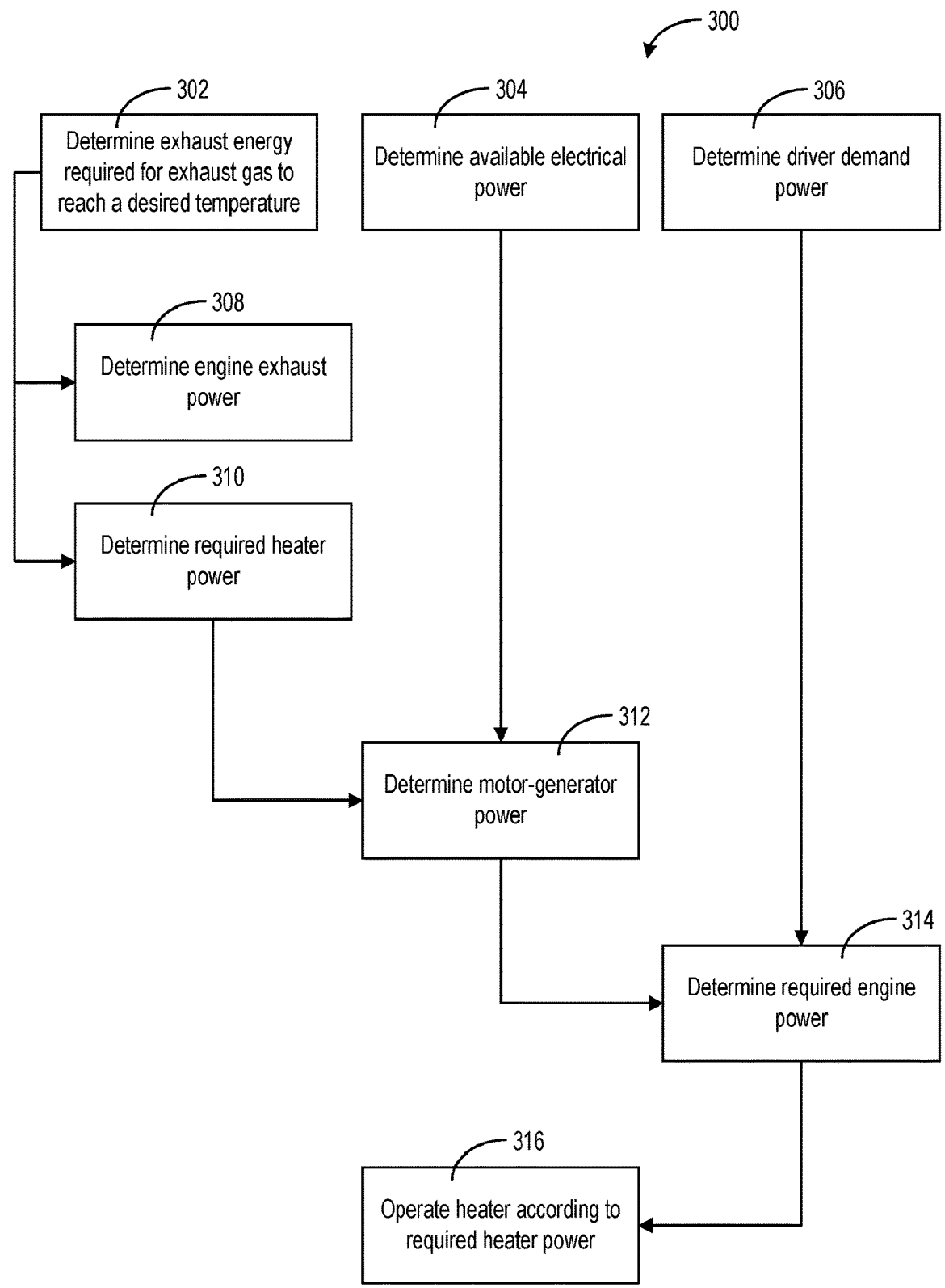
FIG. 3 is a flow diagram of a method to increase exhaust gas temperature during an engine warmup period, according to an exemplary embodiment.

FIG. 3 is a flow diagram of a method 300 to increase exhaust gas temperature during an engine warmup period, according to an exemplary embodiment. The method 300 may be implemented, at least in part, by the controller 122 such that reference is made to the controller 122 to aid in explanation of the method 300.

At step 302, an exhaust energy required for exhaust gas or a catalyst to reach a target temperature is determined. In some embodiments, the exhaust energy required is referred to as a target energy. For example, a vehicle (e.g., the vehicle 100) may be in a cold start mode (e.g., the engine has been started after being off for a period of time, the engine has been started in a cold temperature, etc.). As described, for the aftertreatment system 150 to be effective in neutralizing some of the harmful emissions in the exhaust gas, the exhaust gas must be at a threshold temperature (e.g., 200 degrees Celsius). Upon starting the engine, the sensors 120 determine an initial temperature of the exhaust gas. In some instances, the initial temperature of the exhaust gas is the same as the temperature of the engine. The controller 122 then determines the energy required to increase the temperature of the exhaust gas from the initial temperature to the threshold temperature. In some embodiments, the controller 122 determines a plurality of energy levels required to increase the temperature of the exhaust gas to the threshold temperature, where each energy level determined corresponds to a duration required for the exhaust to reach the threshold temperature. For example, a first energy level may correspond to increasing the temperature of the exhaust gas to the threshold level within a first duration, and a second energy level may correspond to increasing the temperature of the exhaust gas to the threshold level within a second duration. In instances where the first energy level is higher than the second energy level, the first duration is shorter than the second duration (e.g., the temperature of the exhaust gas reaches the threshold level faster when the first energy level is used). In some embodiments, the exhaust energy requirement may be provided as an input by an adjacent controller.

In some embodiments, a total required exhaust power is determined at step 302. As used herein, the term total required exhaust power refers to a total (e.g., cumulative) power of the exhaust gas that is sufficient to raise the temperature of the exhaust gas to the target temperature. In some embodiments, the controller 122 determines the total required exhaust power to increase the temperature of the exhaust gas from the initial temperature to the threshold temperature.

At step 304, the available electrical power is determined. For example, the controller 122 may determine the power available within the power system 108 based on data received from the sensors 120 regarding the operation of the engine system 102. In embodiments where the power system 108 includes a battery and a motor-generator, the controller 122 may determine the SOC of both the battery and the motor-generator to determine the available power. In various embodiments, the controller 122 determines the available electrical power when the engine system 102 is started. In some embodiments, the controller 122 determines the available electrical power continuously as the engine system 102 operates. In some embodiments, the controller 122 determines the available electrical power at regular intervals.

At step 306, the driver demand power is determined. As used herein, the term "driver demand power" ("DDP") refers to the power required from the powertrain system based on the actions of the driver of the vehicle 100. For example, more power is required from the powertrain system when the driver is driving the vehicle 100 at a top speed as compared to when the driver is driving the vehicle 100 at a comparatively low speed. As another example, more power is required from the powertrain system when the vehicle 100 is towing a heavy load as compared to when the vehicle 100 is not towing anything. In some embodiments the controller 122 determines the DDP based on various information received from the sensors 120 (e.g., crankshaft RPM value, engine torque, fuel consumption rate, vehicle speed, etc.). The controller 122 may determine the DDP continuously or at discrete intervals. The powertrain system may be considered to be comprised of all components that produce or transmit power to propel the vehicle and components that absorb the vehicle energy under braking conditions.

At step 308, the engine exhaust power is determined. For example, the controller 122 may receive information indicative of the power of the exhaust gas entering the aftertreatment system 150 from the sensors 120, as described. The information may include a temperature of the exhaust gas, a mass flow rate of the exhaust gas, and a specific heat of the exhaust gas. The information is used to determine the exhaust power using the following expression:

$$P_{exh,inst} = \dot{m}_{exh,inst} \times Cp_{exh,inst} \times (T_{exh,inst} - T_{ref}) \quad (1)$$

In expression (1) above, $P_{exh,inst}$ refers to the power of the exhaust gas at an inlet of the aftertreatment system 150 at an instant in time (e.g., instantaneous). As used herein, the terms "exhaust power," "exhaust gas power," "engine exhaust power," "engine exhaust gas power," "power of the exhaust gas," "instantaneous exhaust power," etc., refer to an instantaneous power of the exhaust gas. The term $\dot{m}_{exh,inst}$ refers to the mass flow rate of the exhaust gas at the given instant in time that is calculated or measured by the sensors 120, the term $Cp_{exh,inst}$ refers to a specific heat of the exhaust gas at the given instant in time, the term $T_{exh,inst}$ refers to the instantaneous temperature of the exhaust gas at the given instant in time at the inlet of the aftertreatment system 150 and is calculated or measured by the sensors 120, and the term $T_{ref}$ refers to a reference temperature. The reference temperature can be, for example, the ambient temperature. Based on expression (1) above, the controller 122 determines the engine exhaust power. The controller 122 may determine the engine exhaust power continuously or at discrete intervals.

As referred to herein, the term "exhaust energy" (and its equivalents) refers to exhaust power accumulated over time. For example, the exhaust power of the engine system 102 may be calculated at times t=0, t=1, t=2, and t=3 and yield exhaust powers of $P_0$ at t=0, $P_1$ at t=1, $P_2$ at t=2, and $P_3$ at t=3. Because energy is the time-integral of power, to calculate an exhaust energy at a particular time ($t_n$), the exhaust power is integrated from t=0 to t=$t_n$. For example, to calculate the exhaust energy a t=2, the exhaust power is integrated from t=0 to t=2 (e.g., the controller 122 or another computing device may calculate the value of the integral to determine the exhaust energy at t=2). One of skill in the art would understand that the example provided above is a particular example and that the relationship between exhaust energy and exhaust power can be applied for any given time or interval. One of skill in the art would also understand that the integration can be calculated as described (e.g., continuously) and can also be calculated in the discrete domain by any of various known mathematical approaches.

At step 310, the allowable power for the aftertreatment system heater 110 is determined. For example, the controller 122 may compare the exhaust energy determined in step 302 with the engine exhaust power determined in step 308 to determine the power required for the aftertreatment system heater 110 to heat the exhaust gas to the desired temperature. In some embodiments, the power required for the aftertreatment system heater 110 is also based on the level of emissions in the exhaust gas. Such embodiments are further described with reference to FIGS. 4 and 5. The controller 122 may determine the required power for the aftertreatment system heater 110 continuously or at discrete intervals. As used to herein, the term "allowable power" for the aftertreatment system heater 110 (e.g., heater power, required heater power, heater power target, heater power limit, etc.) refers to the maximum power that can be provided to the aftertreatment system heater 110 by the power system 108 to operate the aftertreatment system heater 110. In some embodiments, the actual power provided to the aftertreatment system heater 110 by the power system 108 may be less than the allowable heater power. In some embodiments, the actual power provided to the aftertreatment system heater 110 by the power system 108 may be equal to the allowable heater power.

At step 312, the motor-generator power is determined. As used herein, the term "motor-generator power" refers to the power provided by the motor-generator. In this regard, the motor-generator power can be provided to, for example, the aftertreatment system heater 110 or other components electrically coupled to the engine system 102. For example, the controller 122 may determine the power required from the motor-generator based on the available electrical power determined in step 304 and the allowable heater power determined in step 310. The controller 122 may determine the motor-generator power continuously or at discrete intervals.

At step 314, the required engine power is determined. As used herein, the term "engine power" refers to the power provided by the engine system 102. For example, the controller 122 may determine the required engine power based on the DDP determined in step 306 and the motor-generator power determined in step 312. The controller 122 may determine the required engine power continuously or at discrete intervals.

At step 316, the aftertreatment system heater 110 is operated according to the allowable heater power. For example, the controller 122 may determine that the aftertreatment system heater 110 should operate at the allowable heater power and instructs the power system 108 to provide the allowable heater power to the aftertreatment system heater 110 to operate the aftertreatment system heater 110. In another example, the controller 122 may determine that the aftertreatment system heater 110 should operate below the allowable heater power (e.g., at an alternate power that is lower than the allowable heater power) and instructs the power system 108 to provide the alternate power to the aftertreatment system heater 110 to operate the aftertreatment system heater 110.

Figure 4:
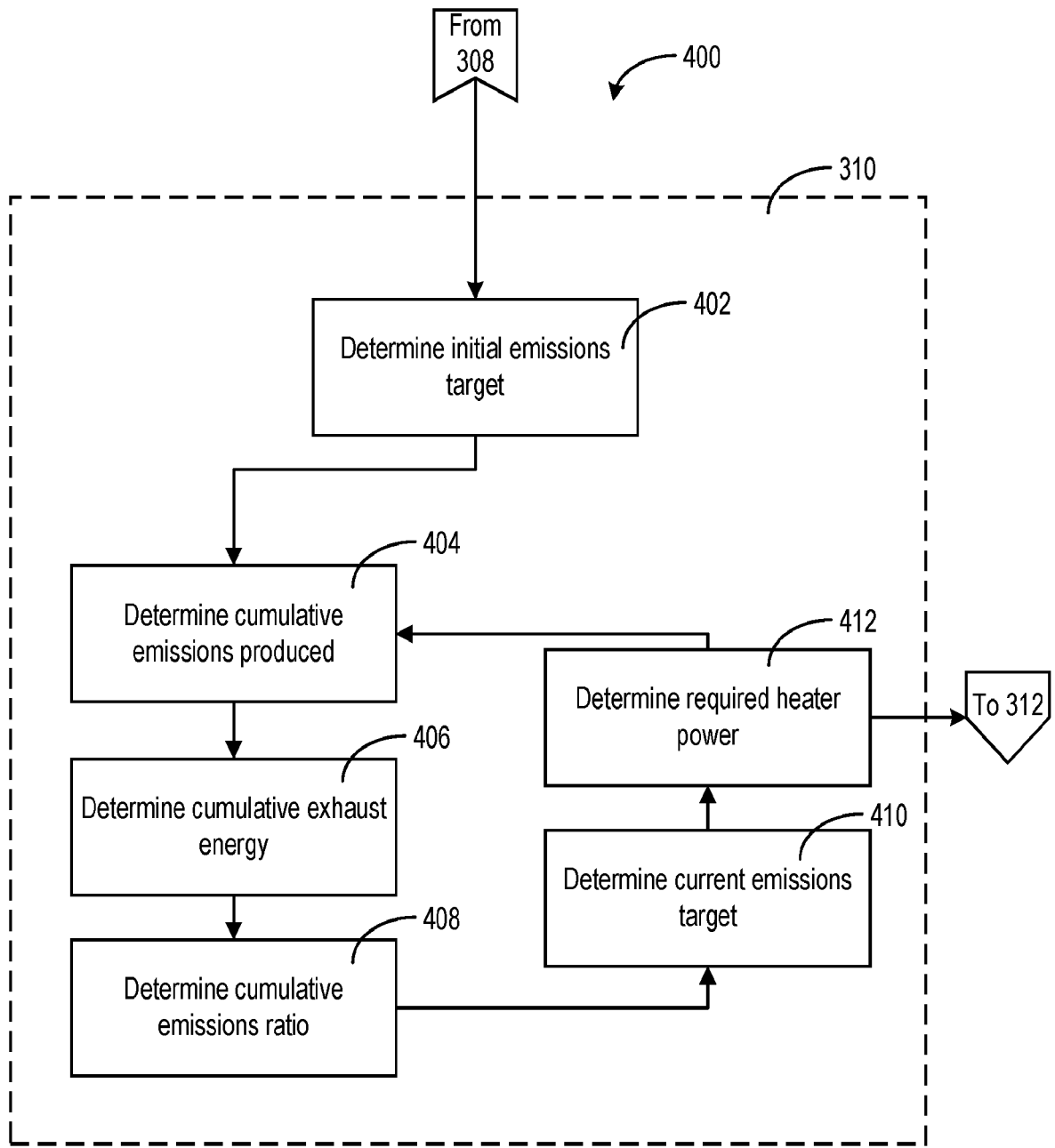
FIG. 4 is a flow diagram of a method to determine the allowable heater power in the method of FIG. 3, according to an exemplary embodiment.

FIG. 4 is a flow diagram of a method 400 to determine the allowable heater power in step 310 of the method 300 of FIG. 3, according to an exemplary embodiment. The method 400 may be implemented, at least in part, by the controller 122 such that reference is made to the controller 122 to aid in explanation of the method 400.

At step 402, an initial emissions target is determined. In some embodiments, the initial emissions target is based on the level of emissions contributed by the engine system 102 operating during a cold start (e.g., a cold cycle) to the overall emissions target (e.g., the level of emissions combined during a cold cycle and a warm cycle). In some embodiments, the controller 122 determines the initial emissions target by dividing the allowable cold start emissions by the exhaust energy required (determined in step 302 of FIG. 3). In other embodiments, the initial emissions target may be determined by dividing the allowable cold start emissions by the work required by the engine system 102 to warm up the aftertreatment system 150. In some embodiments, the initial emissions target is also referred to as the target emissions.

At step 404, the cumulative emissions produced by the engine system 102 is determined. For example, the sensors 120 may include an emissions sensor that provides the controller 122 with information indicative of the level of emissions produced on a regular basis (e.g., continuously, regular intervals, etc.). The controller 122 processes the information provided and determines the cumulative emissions produced by the engine system 102 each time the controller receives information from the sensors 120.

At step 406, the cumulative exhaust energy from (or, for example, the cumulative work done by) the engine system 102 is determined. For example, the sensors 120 may provide the controller 122 with information indicative of the exhaust energy expended on a regular basis (e.g., continuously, regular intervals, etc.). The controller 122 processes the information provided and determines the cumulative exhaust energy expended each time the controller 122 receives information from the sensors 120.

At step 408, the cumulative emissions ratio is determined. For example, the controller 122 determines the cumulative emissions ratio by dividing the cumulative emissions produced by the cumulative exhaust energy. In some embodiments, the controller 122 determines the cumulative emissions ratio each time the controller receives information regarding the emissions produce by the engine system 102 and the exhaust energy produced by the engine system 102.

At step 410, the current emissions target is determined. In an example embodiment, the controller 122 may use the following equation to determine the current emissions target ($E_C$):

$$E_C = \frac{(K*Y) - (k*y)}{(Y-y)} \quad (2)$$

In equation (2) above, K is the initial emissions target, k is the cumulative emissions up to the current instant, Y is the exhaust energy requirement, and y is the cumulative exhaust energy or work done by the engine system 102 up to the current instant. In some embodiments, the controller may determine the current emissions target using lookup tables based on various determined values.

At step 412, the allowable aftertreatment system heater power is determined. In some embodiments, the power required for the aftertreatment system heater 110 is determined by the controller 122 comparing the emissions target determined in step 410 to lookup tables that correlate a specified emissions target or emissions target range with a power requirement for the aftertreatment system heater 110. In an example embodiment, the lookup tables are created by conducting various experiments to determine the correlation between the emissions target and the allowable heater power. In some embodiments, the lookup tables are created by solving equations to determine the correlation between the emissions target and the allowable heater power. For example, the controller may determine that the current emissions target is 0.1 grams per horsepower-hour (g/hp-hr). The controller 122 then determines the power required by the aftertreatment system heater 110 using the lookup tables based on the current emissions target. After determining the allowable heater power at step 412, the method 300 continues to step 312, as shown.

The steps 404-412 are shown as a loop. In an example embodiment, steps 404-412 are executed at regular intervals (e.g., every one millisecond, every two milliseconds, every five milliseconds, every ten milliseconds, etc.) until the engine system 102 has warmed up (e.g., until the exhaust gas or catalyst reaches the desired temperature).

Figure 5:
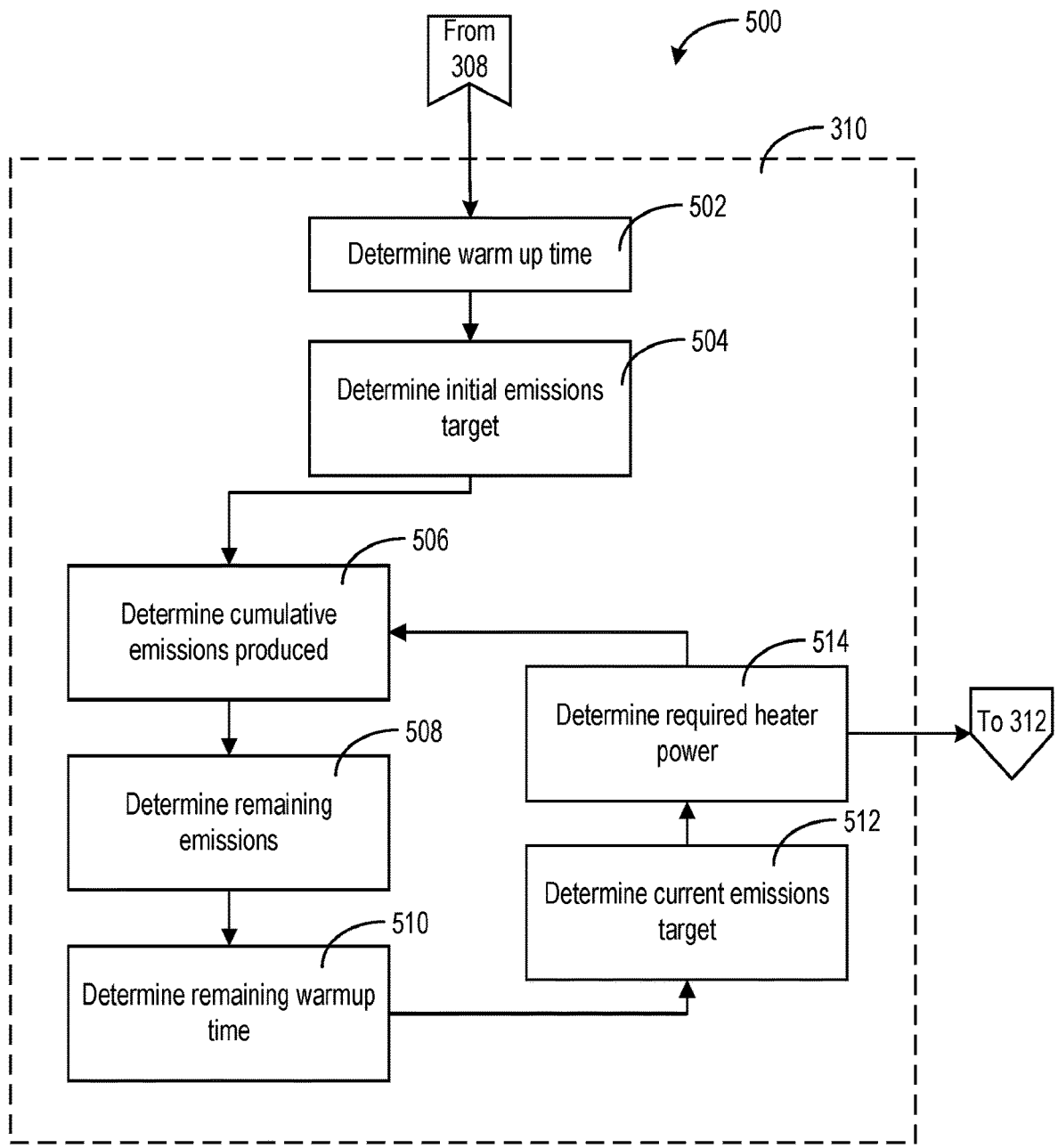
FIG. 5 is a flow diagram of another method to determine the allowable heater power in the method of FIG. 3, according to an exemplary embodiment.

FIG. 5 is a flow diagram of another method 500 to determine the allowable heater power in the method of FIG. 3, according to an exemplary embodiment. The method 500 may be implemented, at least in part, by the controller 122 such that reference is made to the controller 122 to aid in explanation of the method 500.

At step 502, an allowable warm up time is determined. For example, the controller 122 may determine, based on various factors, the maximum time required for the catalyst to warm up (e.g., the allowable warm up time is the maximum time required for the exhaust gas to reach a threshold temperature above which there is sufficient catalyst activity). In some embodiments, the controller 122 may determine, based on various factors, a desired warm up time or warm up rate, where the desired warm up time is less than the allowable warm up time. In some embodiments, the allowable warm up time and the desired warm up time are the same; in some embodiments, the allowable warm up time and the desired warm up time are different. In some embodiments, the factors from which the controller 122 makes the determination include, but are not limited to, a temperature of the engine system 102, an ambient temperature, a temperature of the exhaust gas, an engine load, an engine emissions level, the exhaust energy required (determined in step 302 of FIG. 3) etc. In some cases, the allowable warm up time is received as an input from one or more adjacent controllers.

At step 504, an initial emissions target is determined. In some embodiments, the initial emissions target is based on the level of emissions contributed by the engine system 102 operating during a cold start (e.g., a cold cycle) to the overall emissions target (e.g., the level of emissions combined during a cold cycle and a warm cycle). In some embodiments, the controller 122 determines the initial emissions target by dividing the engine out cold start emissions by the exhaust energy required (determined in step 302 of FIG. 3) to warm up the aftertreatment system 150. In some embodiments, the initial emissions target is a set parameter.

At step 506, the cumulative emissions produced is determined. For example, the controller 122 may receive information indicative of a level of emissions produced by the engine system 102 from the sensors 120 at regular intervals (e.g., every one millisecond, every two milliseconds, every five milliseconds, every ten milliseconds, etc.). The controller 122 may determine the level of emissions produced during the regular intervals based on the information provided by the sensors 120. The controller may also determine the cumulative emissions produced by adding the determined level of emissions produced at each of the regular intervals.

At step 508, the remaining emissions is determined. For example, the controller 122 may determine the amount of emissions remaining before the cumulative emissions produced reaches the initial emissions target (e.g., the amount of emissions remaining before the engine system 102 has warmed up).

At step 510, the time remaining in the warmup period is determined. For example, the controller 122 may determine the time remaining in the warmup period by comparing the time determined in step 502 to the time elapsed since the method 500 was initiated.

At step 512, a current emissions target is determined. In an example embodiment, the controller may determine the current emissions target by determining the emissions rate allowed before the end of the warm up time, and divide the current emissions target by a current power request of the engine system 102. In some embodiments, the controller uses the following equations to determine the current emissions target:

$$E_R = \frac{(X - x)}{(T - t)} \tag{3}$$

$$E_T = \frac{E_R}{P} \tag{4}$$

In the equations above, $E_R$ is the emissions rate allowed before the end of the warm up time, X, is total emissions allowed during the cold cycle (e.g., during the warm up time), x is the emissions produced during the elapsed warmup time, T is the total time required for warm up, t is the elapsed warm up time, and P is the current total exhaust power request to raise the temperature of the exhaust gas or catalyst to the desired level.

At step 514, the required power for the aftertreatment system heater 110 is determined. In some embodiments, the power required for the aftertreatment system heater 110 is determined by the controller 122 comparing the emissions target determined in step 512 to lookup tables that correlate a specified emissions target or emissions target range with a power requirement for the aftertreatment system heater 110. In an example embodiment, the lookup tables are created by conducting various experiments to determine the correlation between the emissions target and the allowable heater power. In some embodiments, the lookup tables are created by solving equations to determine the correlation between the emissions target and the allowable heater power. For example, the controller may determine that the current emissions target is 0.1 grams per horsepower-hour (g/hp-hr). The controller 122 then determines the power required by the aftertreatment system heater 110 using the lookup tables based on the current emissions target. After determining the allowable heater power at step 514, the method 300 continues to step 312, as shown.

The steps 506-514 are shown as a loop. In an example embodiment, steps 506-514 are executed at regular intervals (e.g., every one millisecond, every two milliseconds, every five milliseconds, every ten milliseconds, etc.) until the engine system 102 has warmed up (e.g., until the exhaust gas reaches the desired temperature without the aid of the aftertreatment system heater 110).

By implementing the methods 300, 400, and 500 as described in FIGS. 3-5, the controller 122 can control the power provided to the aftertreatment system heater 110 to balance various tradeoffs. For example, the controller 122 may operate to balance the tradeoff between emissions produced by the engine system 102 and the temperature of the exhaust during a warm up mode (e.g., a catalyst warm up mode). For example, as the temperature of the exhaust during the warm up mode increases (e.g., by using the aftertreatment system heater 110), the emissions produced by the engine system 102 may also increase, therefore the controller 122 operates to balance the tradeoff between a warmer (or colder) exhaust and higher (or lower) emissions. The controller 122 may also operate to balance the tradeoff between fuel consumption and the temperature of the exhaust during a warm up mode. For example, as the temperature of the exhaust during warm up mode increases (e.g, by using the aftertreatment system heater 110), the fuel consumption of the engine system 102 also increases, therefore the controller 122 operates to balance the tradeoff between a warmer (or colder) exhaust and higher (or lower) fuel consumption. The controller 122 may also operate to balance the tradeoff between the target emissions and the engine speed. For example, as the engine speed increases the target emissions may also increase, therefore the controller 122 operates to balance the tradeoff between a faster (or slower) engine speed and higher (or lower) emissions. As described, the controller 122 determines and/or estimates the tradeoffs based on changes in engine load and power supplied to the aftertreatment system heater 110 throughout the warm up time. These tradeoffs are used to determine one or more heater power limits (e.g., the power supplied to the aftertreatment system heater 110) and to modify of operation of the engine system 102.

Figure 6:
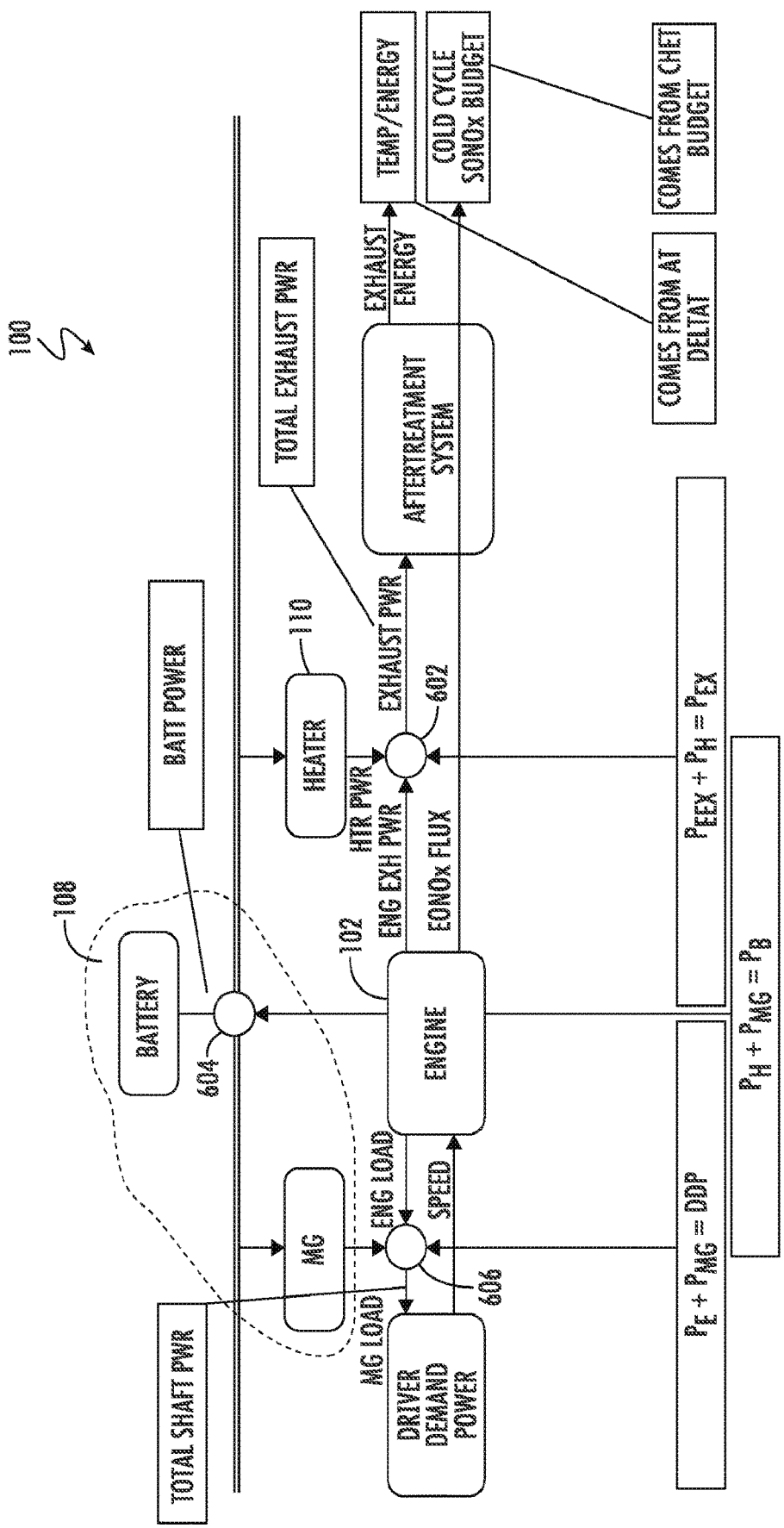
FIG. 6 is a diagram of a portion of the vehicle system of FIG. 1 showing expressions used to evaluate the allowable heater power in the method of FIG. 3, according to an exemplary embodiment.

FIG. 6 is a diagram of a portion of the vehicle system 100 of FIG. 1 showing expressions used to evaluate the allowable heater power in the method 300 of FIG. 3, according to an exemplary embodiment.

As shown in the figure, block 602 is positioned between the aftertreatment system 150 and both the engine system 102 and the aftertreatment system heater 110. At block 602, the following expression is evaluated:

$$P_{EX} = P_H + P_{EEX} \quad (5)$$

In expression (5), $P_{EEX}$ refers to the engine exhaust power (e.g., the amount of energy the engine system 102 has put into the exhaust gas), $P_H$ refers to the power supplied to the aftertreatment system heater 110, and $P_{EX}$ refers to the exhaust power (e.g., the amount of energy within the exhaust gas entering the aftertreatment system 150). As described above, the required amount of power required to raise the temperature of the exhaust gas from a cold start temperature to a temperature at which the aftertreatment system 150 will be effective is known (e.g., the value can be determined by the controller 122 based on various conditions). Accordingly, the controller must determine both $P_H$ and $P_{EX}$ in expression (3). As described, in some embodiments $P_H$ can be determined by evaluating a lookup table based on the level of emissions produced by the engine system 102. In some embodiments, $P_{EX}$ is imposed as an external demand from an adjacent controller.

Block 604 is positioned between the power system 108 and the aftertreatment system heater 110. At block 604, the following expression is evaluated:

$$P_H + P_{MG} = P_B \quad (6)$$

In expression (6) above, $P_{MG}$ is the power provided by the motor-generator and $P_B$ is the power provided by the battery. As described above, the sensors 120 are configured to provide the controller 122 with information for the controller 122 to determine a SOC of the battery and the motor-generator (e.g., the alternator). The SOC of the battery is the amount of power stored in the battery that can be discharged (e.g., provided to other components such as, for example, the aftertreatment system heater 110). Accordingly, the SOC of the battery is a known quantity at each time for which the sensors 120 provide SOC information to the controller 122. The controller 122 can therefore determine, based on the SOC of the battery and the power supplied to the aftertreatment system heater 110, the power provided by the motor-generator.

In some embodiments, the vehicle system 100 does not include a battery. In such embodiments, $P_B=0$ and the power provided to the aftertreatment system heater 110 is completely supplied by the motor-generator. In embodiments without a battery, instead of power being directed from a battery to the motor-generator and the aftertreatment system heater 110, as shown in FIG. 6, power is directed from the motor-generator to the aftertreatment system heater 110.

Block 606 is positioned between a drive cycle and both the power system 108 and the engine system 102. At block 606, the following expression is evaluated:

$$P_E + P_{MG} = DDP \quad (7)$$

In expression (7) above, DDP is the driver demand power. To determine the DDP, the controller 122 receives information from the sensors 120 indicative of the demands the driver is putting on the vehicle 100. For example, the controller 122 may receive information from the sensors 120 related to characteristics of the vehicle 100 such as a position of the accelerator pedal, vehicle speed, engine torque, fuel consumption, engine revolutions per minute (RPM), incline of the vehicle 100, etc. Based on the information received from the sensors 120, the controller 122 determines the DDP and can then determine, based on the power provided by the motor-generator, the power of the engine system 102.

Expressions (3)-(5) provide an algorithm executed by the controller 122 to determine, at a given time for which the controller 122 receives information from the sensors 120, $P_H$, $P_{EEX}$, $P_{MG}$, and $P_E$. These expressions, coupled with information regarding the level of emissions produced by the engine system 102 (as described with reference to FIGS. 3-5), are evaluated by the controller 122 to determine and evaluate the tradeoffs associated with providing differing levels of power to the aftertreatment system heater 110. For example, providing power to the aftertreatment system heater 110 increases the temperature of the exhaust gas faster than if a heater were not used, thereby causing the exhaust gas to reach a threshold temperature (e.g., the temperature at which the aftertreatment system 150 is effective at removing emissions from the exhaust gas) sooner and begin reducing emissions sooner. However, in some instances providing additional power to the aftertreatment system heater 110 increases the load on the engine system 102 such that the engine system 102 produces more emissions than can be effectively reduced by the aftertreatment system 150. Accordingly, the controller 122 evaluates these tradeoffs and determines a desirable amount of power to provide to the aftertreatment system heater 110. Generally, as long as providing power to the aftertreatment system heater 110 does not proportionately increase the emissions or fuel consumption from the engine system 102, providing power to the aftertreatment system heater 110 is desirable.

Figure 7:
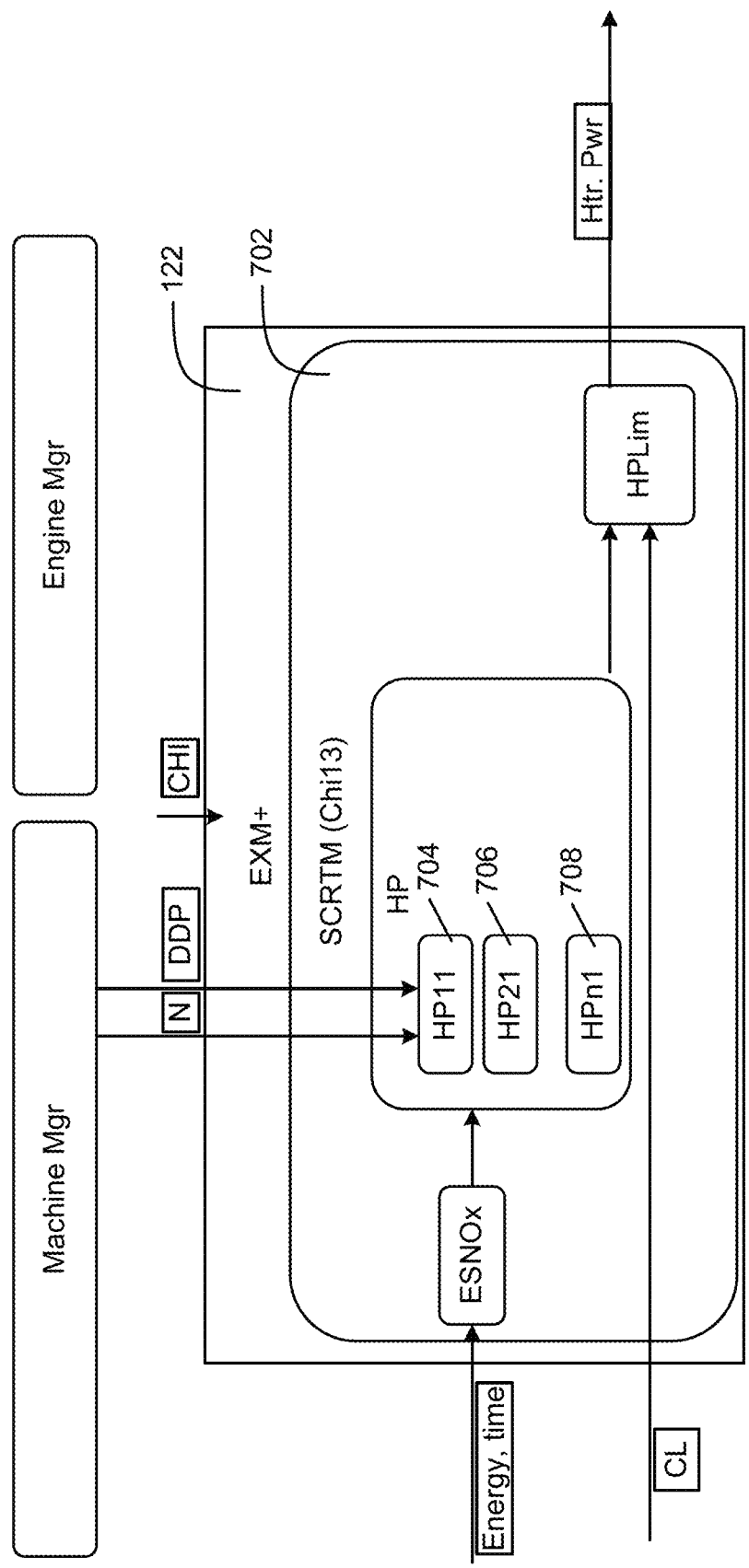
FIG. 7 is an illustration of the controller of FIG. 1 determining how much heater power to provide, according to an exemplary embodiment.

FIG. 7 is an illustration of the controller 122 of FIG. 1 determining how much heater power to provide, according to an exemplary embodiment. In the embodiment depicted in FIG. 7, the power system 108 does not include a battery. As shown, the controller 122 receives information indicative of the DDP and the emissions target (e.g., as determined in FIGS. 3-4) of the engine system 102. The controller 122 then references a lookup table portion 702. The lookup table portion 702 includes a first lookup table 704, a second lookup table 706, and a third lookup table 708 (collectively referred to herein as "lookup tables 704-708"). Though three lookup tables are shown, one of skill would understand that more or fewer lookup tables may be implemented. The lookup tables 704-708 include information related to the power provided to the aftertreatment system heater 110 based on the emissions level associated with the engine system 102 and the DDP associated with the engine system 102. For example, the controller 122 receives information from the sensors 120 related to the emissions level in the engine system 102 and determines, based on the determined emissions level, an appropriate one of the lookup tables 704-708 to reference. The controller determines, based on the lookup tables 704-708 and the emissions level, an appropriate amount of power for the power system 108 to provide to the aftertreatment system heater 110.

The controller 122 also receives information related to the charge limit ("CL") from the sensors 120. The CL indicates how much power is available via the motor-generator that can be provided to the aftertreatment system heater 110. The controller 122 then compares the appropriate amount of power determined to the CL to determine whether enough power is available to provide the appropriate amount of power to the aftertreatment system heater 110. In embodiments where the appropriate amount of power is less than the CL, the controller instructs the power system 108 to provide the appropriate amount of power to the aftertreatment system heater 110. In embodiments where the appropriate amount of power is greater than the CL, there is not enough available power to provide the appropriate amount of power to the aftertreatment system heater 110. In such embodiments, the controller 122 determines a different amount of power to provide to the aftertreatment system heater 110. In some implementations, the different amount of power is equal to the CL such that all available power is directed to the aftertreatment system heater 110. In some implementations, the different amount of power is less than the CL. The controller 122 then directs the power system 108 to provide the different amount of power to the aftertreatment system heater 110.

Figure 8:
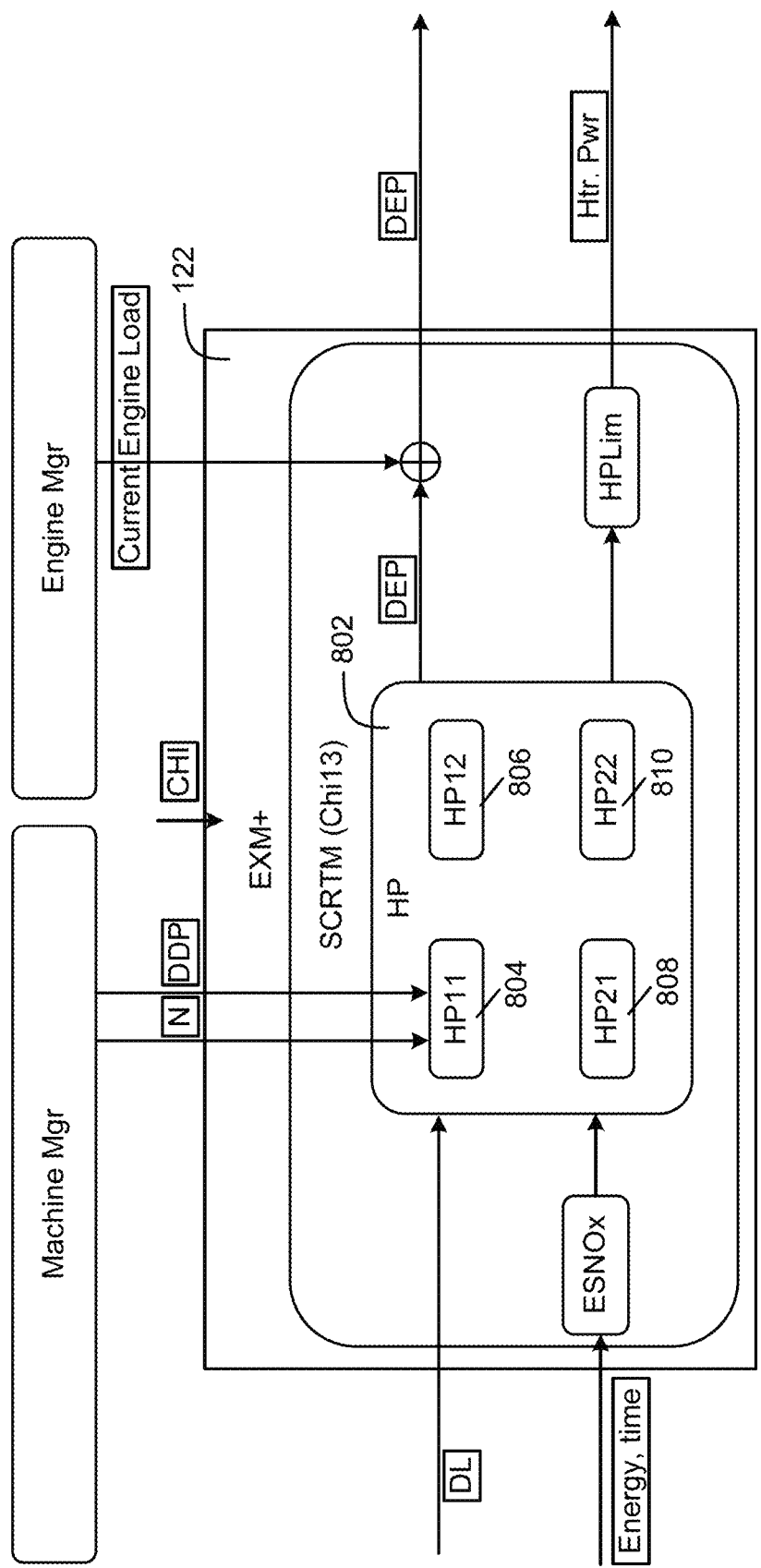
FIG. 8 is another illustration of the controller of FIG. 1 determining how much heater power to provide, according to an exemplary embodiment.

FIG. 8 is another illustration of the controller of FIG. 1 determining how much heater power to provide, according to an exemplary embodiment. In the embodiment depicted in FIG. 8, the power system 108 includes a battery. As shown, the controller 122 receives information from the sensors 120 indicative of the DDP, the amount of emissions produced by the engine system 102, and the discharge limit ("DL"). The DL indicates how much power is available in the battery that can be provided to the aftertreatment system heater 110. The controller 122 then references a lookup table portion 802. The lookup table portion 802 includes a first lookup table 804, a second lookup table 806, a third lookup table 808, and a fourth lookup table 810 (collectively referred to herein as "lookup tables 804-810"). Though four lookup tables are shown, one of skill would understand that more or fewer lookup tables may be implemented. The lookup tables 804-810 include information related to the power provided to the aftertreatment system heater 110 based on the emissions level associated with the engine system 102, the DDP associated with the engine system 102, and the DL associated with the power system 108. For example, the controller 122 receives information from the sensors 120 related to the emissions level in the engine system 102, the DDP associated with the engine system 102, and the DL associated with the power system 108 and determines, based on the determined emissions level, DDP, and DL, an appropriate one of the lookup tables 804-810 to reference. The controller 122 determines, based on the lookup tables 804-810 and the determined information, an appropriate amount of power for the power system 108 to provide to the aftertreatment system heater 110.

The controller 122 then directs the power system 108 to provide the appropriate amount of power to the aftertreatment system heater 110. Furthermore, the controller 122 determines the change in engine power ("delta EP," or "DEP") that occurs as a result of diverting some (or all) of the available power in the battery to the aftertreatment system heater 110.

Figure 9:
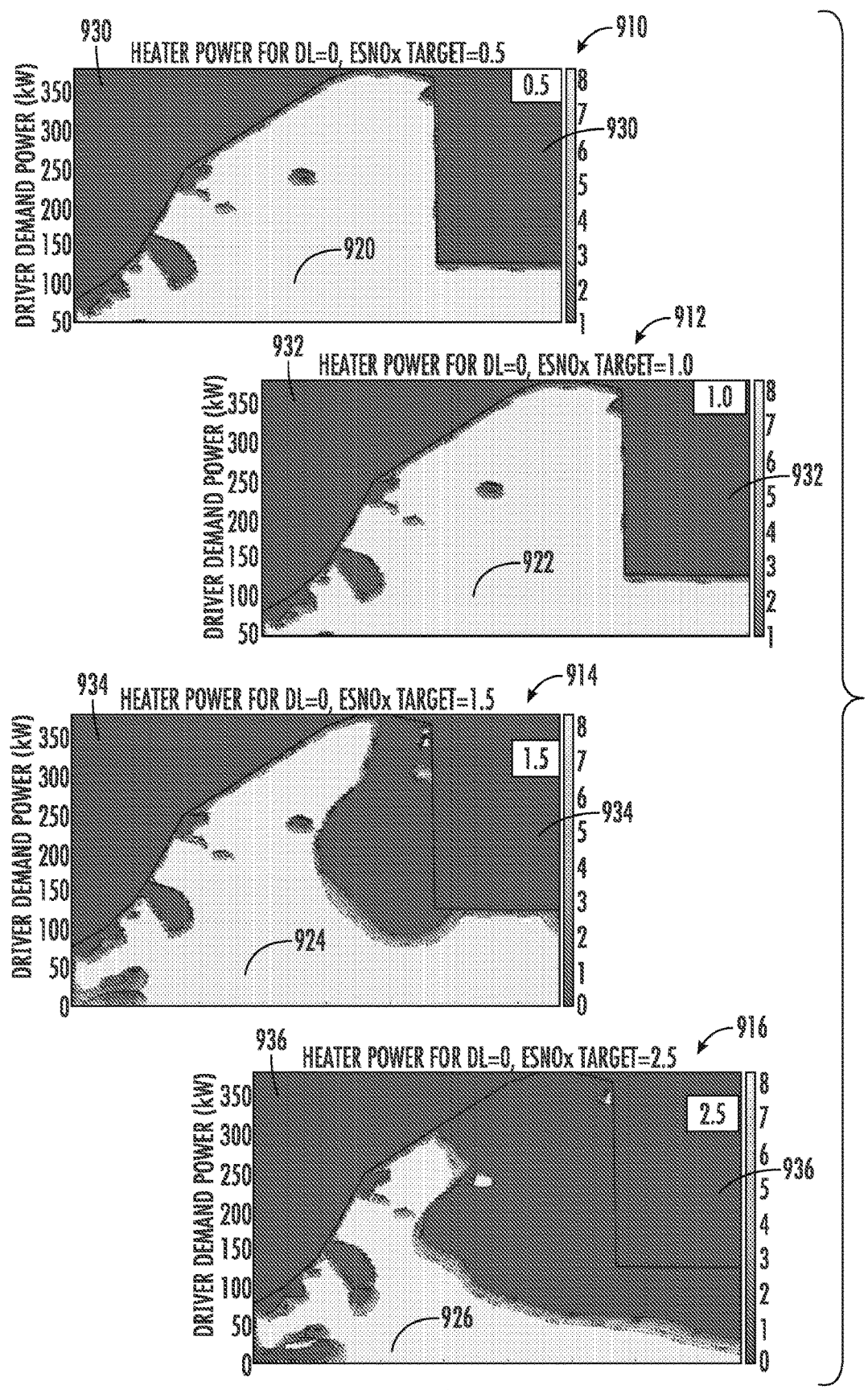
FIG. 9 is an illustration of various heater power maps in a system that does not include a battery, according to an exemplary embodiment.

FIG. 9 is an illustration of various heater power maps in a system that does not include a battery, according to an exemplary embodiment. As shown, FIG. 9 includes a first heater power map 910, a second heater power map 912, a third heater power map 914, and a fourth heater power map 916 (collectively referred to herein as "heater power maps 910-916"). The heater power maps 910-916 each show an amount of power provided to a heater (e.g., the aftertreatment system heater 110) based on a target amount of emissions, the driver demand power (on the vertical axis) and the engine speed (in RPM, on the horizontal axis). For example, the first heater power map 910 shows the amount of power provided to the aftertreatment system heater 110 when the emissions target is 0.5 g/hp-hr, and the second heater power map 912 shows the amount of power provided to the aftertreatment system heater 110 when the emissions target is 1.0 g/hp-hr. The third heater power map 914 shows the amount of power provided to the aftertreatment system heater 110 when the emissions target is 1.5 g/hp-hr, and the fourth heater power map 916 shows the amount of power provided to the aftertreatment system heater 110 when the emissions target is 2.5 g/hp-hr. Each of the heater power maps 910-916 includes a light portion (e.g., the first light portion 920, the second light portion 922, the third light portion 924, and the fourth light portion 926) that corresponds to the aftertreatment system heater 110 being fully powered. Additionally, each of the heater power maps 910-916 includes a dark portion (e.g., the first dark portion 930, the second dark portion 932, the third dark portion 934, and the fourth dark portion 936) that corresponds to the aftertreatment system heater 110 being off (e.g., provided with no power). In between the light portions 920-926 and the dark portions 930-936 are regions where the aftertreatment system heater 110 is provided with less than full power by the power system 108.

As shown by the heater power maps 910-916, as the target amount of emissions increases (e.g., the acceptable amount of emissions to release to the environment increases) the area where the aftertreatment system heater 110 is fully powered decreases.

Figure 10:
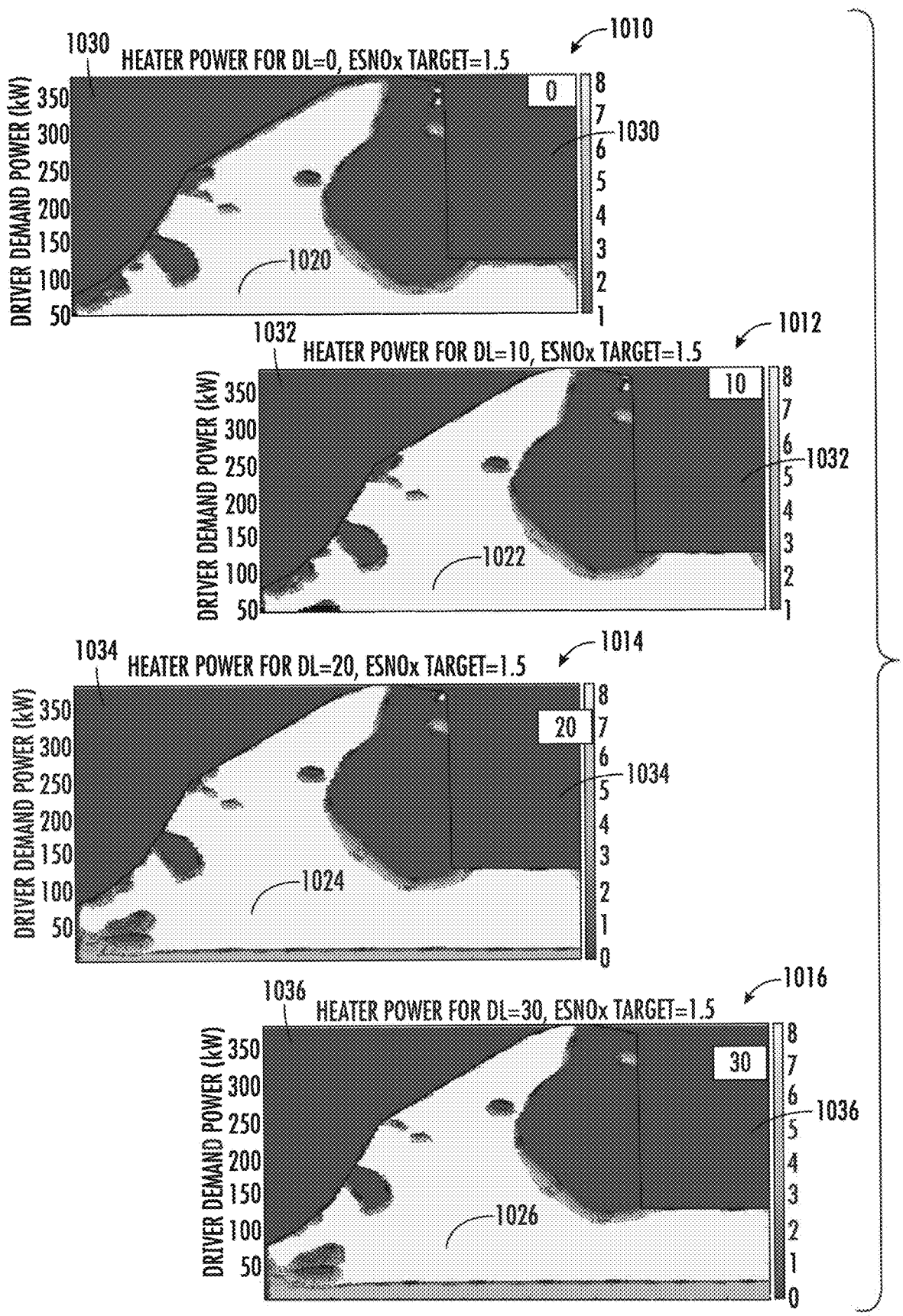
FIG. 10 is an illustration of various heater power maps in a system that includes a battery, according to an exemplary embodiment.

FIG. 10 is an illustration of various heater power maps in a system that includes a battery, according to an exemplary embodiment. In an example embodiment, the battery is part of a power system (e.g., the power system 108) that includes a motor-generator and the battery. As shown, FIG. 10 includes a first heater power map 1010, a second heater power map 1012, a third heater power map 1014, and a fourth heater power map 1016 (collectively referred to herein as "heater power maps 1010-1016"). The heater power maps 1010-1016 each show an amount of power provided to a heater (e.g., the aftertreatment system heater 110) based on an available discharge limit for the battery, the driver demand power (on the vertical axis) and the engine speed (in RPM, on the horizontal axis), when given a constant emissions target. For example, as shown, the heater power maps 1010-1016 were generated based on an emissions target of 1.5 g/hp-hr. For example, the first heater power map 1010 shows the amount of power provided to the aftertreatment system heater 110 when the discharge limit is zero (e.g., there is no battery or the battery is not sufficiently charged), and the second heater power map 1012 shows the amount of power provided to the aftertreatment system heater 110 when the discharge limit is ten kilowatts (kW). The third heater power map 1014 shows the amount of power provided to the aftertreatment system heater 110 when the discharge limit is twenty kW, and the fourth heater power map 1016 shows the amount of power provided to the aftertreatment system heater 110 when the discharge limit is 30 kW. Each of the heater power maps 1010-1016 includes a light portion (e.g., the first light portion 1020, the second light portion 1022, the third light portion 1024, and the fourth light portion 1026) that corresponds to the aftertreatment system heater 110 being fully powered. Additionally, each of the heater power maps 1010-1016 includes a dark portion (e.g., the first dark portion 1030, the second dark portion 1032, the third dark portion 1034, and the fourth dark portion 1036) that corresponds to the aftertreatment system heater 110 being off (e.g., provided with no power). In between the light portions 1020-1026 and the dark portions 1030-1036 are regions where the aftertreatment system heater 110 is provided with less than full power by the power system 108.

As shown by the heater power maps 1010-1016, as the discharge limit increases (e.g., the available power in the battery increases) the area where the aftertreatment system heater 110 is fully powered increases (e.g., the more power that is available for the aftertreatment system heater 110, the more power can be provided to the aftertreatment system heater 110).

After the aftertreatment system 150 has reached the desired temperature and the engine system 102 has warmed up, in some embodiments it is desirable to maintain the temperature of the exhaust gas at a desired level to maintain the efficiency of the aftertreatment system 150 (e.g., the engine is in a "stay warm mode").

Figure 11:
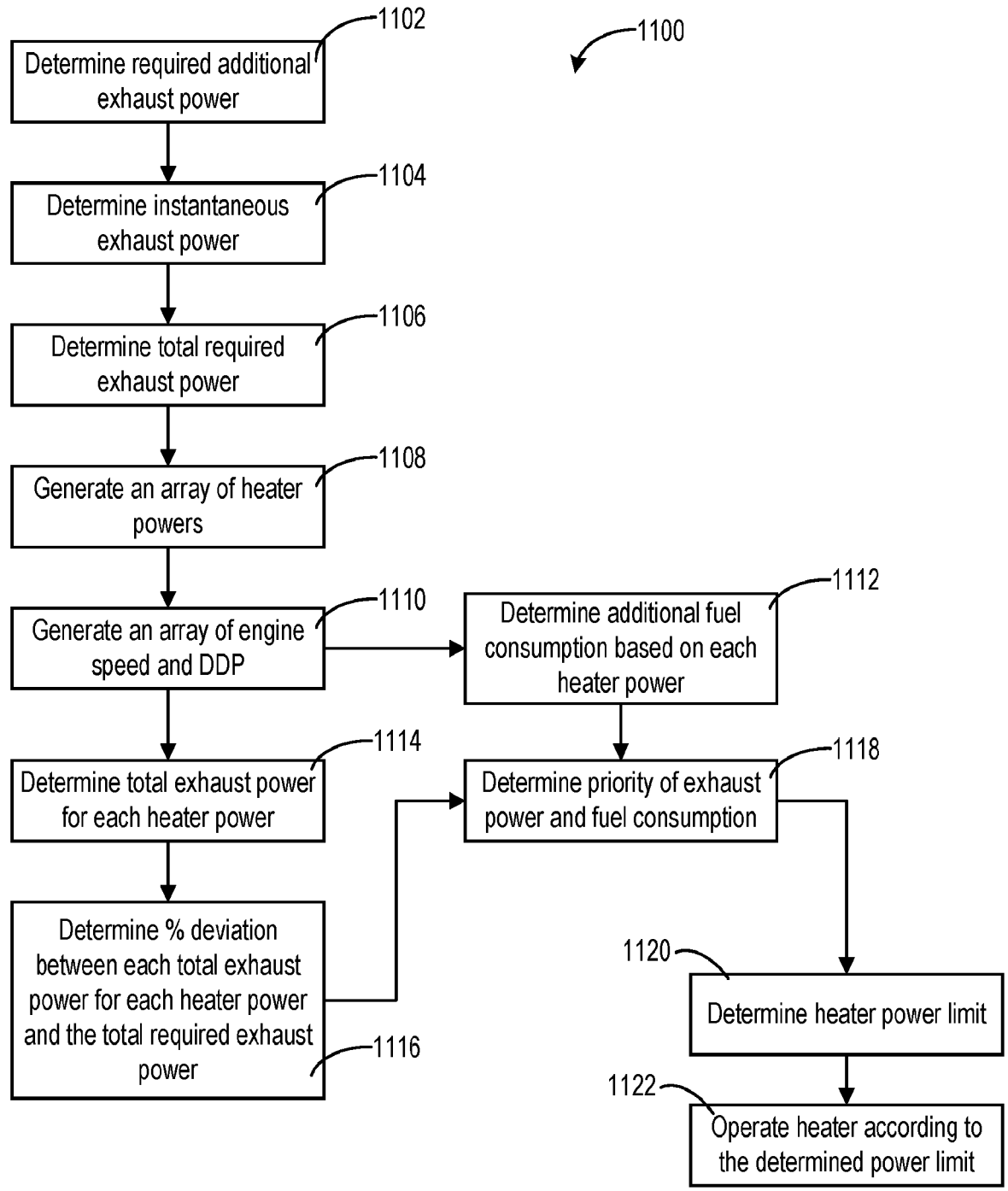
FIG. 11 is a flow diagram of a method to maintain exhaust gas temperature after an engine warmup period, according to an exemplary embodiment.

FIG. 11 is a flow diagram of a method 1100 to maintain an exhaust gas temperature after an engine warmup period, according to an exemplary embodiment. The method 1100 may be implemented, at least in part, by the controller 122 such that reference is made to the controller 122 to aid in explanation of the method 1100.

At step 1102, a required additional exhaust power to maintain an exhaust gas temperature is determined. For example, a vehicle (e.g., the vehicle 100) may have started and warmed up such that the engine system associated with the vehicle 100 (e.g., the engine system 102) is in a warm mode. As described, for the aftertreatment system 150 to be effective in neutralizing some of the harmful emissions in the exhaust gas, the exhaust gas must be at a threshold temperature (e.g., 200 degrees Celsius). Accordingly, if the temperature of the exhaust gas falls below the threshold temperature when the engine system 102 is in a warm mode, it may be necessary to provide additional heat to the exhaust gas (e.g., via the aftertreatment system heater 110) to maintain the exhaust gas at or above the threshold temperature. The controller 122 may receive information from the sensors 120 that is indicative of the temperature of the exhaust gas. Based on the temperature determined by the controller 122, the controller 122 may determine that the temperature of the exhaust gas must increase by a certain amount to reach the threshold temperature or another desired temperature above the threshold temperature. The controller 122 can determine the amount of additional exhaust power associated with increasing the temperature of the exhaust gas to the threshold temperature or other desired temperature.

At step 1104, the instantaneous exhaust gas power is determined. For example, the controller 122 may receive information from the sensors 120 indicative of the instantaneous exhaust gas temperature and exhaust flow rate. The instantaneous exhaust gas power is then calculated by the controller 122 using expression (1) above.

At step 1106, the total required exhaust power is determined. For example, the controller 122 may determine, based on the required additional exhaust power and the instantaneous exhaust power (from step 1104), the total exhaust power required to increase and/or maintain the temperature of the exhaust gas. In some embodiments, as the engine is subjected to increasing loads, the required additional exhaust power decreases (e.g., as the engine is subjected to increasing loads, the temperature of the exhaust gas increases based on the increasing loads).

At step 1108, an array of heater powers is generated. For example, the controller 122 may generate an array of heater power that may be provided to the aftertreatment system heater 110. The array may include various levels of power that may be provided to the aftertreatment system heater 110 including, but not limited to, zero power (e.g., the aftertreatment system heater 110 is off), maximum power (e.g., the aftertreatment system heater 110 is operating at maximum power), and various power levels in between (e.g., the aftertreatment system heater 110 is operating at less than maximum power).

At step 1110, an array of engine speed and engine torque corresponding to the same instantaneous DDP, when the heater is operated at each of the powers generated at step 1108, is generated. As shown in FIG. 4, operation of the heater results in a different engine operating condition to maintain the same DDP. For example, the controller 122 may generate an array with the same engine speed and different engine torque, for different heater powers. In other embodiments, the generated array could include a set of different engine speeds and engine torques. The example of using the same engine speed with different torque, while maintaining DDP with different heater powers, will be described with reference to step 1112.

At step 1112, a determination is made regarding the fuel consumption associated with each heater power generated in step 1108, at the instantaneous engine DDP. In some embodiments, the controller 122 may determine the fuel consumption associated with each engine speed and torque in the array generated in step 1110, which correspond to the same instantaneous DDP.

At step 1114, the set of possible total exhaust powers corresponding to each heater power generated in step 1108 is determined. For example, based on each of the combinations of engine speed and torque for the same DDP generated in step 1110, the controller 122 determines a total exhaust power for each heater power generated in step 1108.

At step 1116, the percent deviation between each total exhaust power determined in step 1114 and the total required exhaust power determined in step 1106 is found. For example, the controller 122 compares each of the total exhaust powers determined in step 1114 to the total required exhaust power determined in step 1106 and determines how close each of the total exhaust powers determined in step 1114 is to the total required exhaust power determined in step 1106 (e.g., the percent deviation).

At step 1118, a priority of exhaust power and fuel consumption is determined. For example, the controller 122 determines whether to prioritize exhaust power or fuel consumption based on the total efficiency of the engine system 102. Similar to increasing a temperature of the exhaust gas in a cold start environment, certain tradeoffs exist when providing power to the aftertreatment system heater 110 to maintain a temperature of the exhaust gas in a warm environment. For example, as the amount of heater power required to meet the target exhaust power increases, the amount of fuel consumption also increases. Accordingly, the controller 122 may seek to minimize the following expression when determining a heater power limit:

$$(1-k)\left(\frac{P_{exh,target} - P_{exh,selected}}{P_{exh,selected}}\right) + k\left(\frac{P_{fuel,selected} - P_{fuel-htroff}}{P_{fuel-htroff}}\right) \quad (8)$$

In expression (8) above, $P_{exh,target}$ is the total required exhaust power determined in step 1106, $P_{exh,selected}$ refers to each total exhaust power determined in step 1114 corresponding to each element of engine speed and torque array in step 1110, $P_{fuel,selected}$ refers to each fuel consumption determined in step 1112 corresponding to each element of engine speed and torque array in step 1110, and $P_{fuel-htroff}$ is the fuel consumption associated with the heater being off. The term k is a constant (e.g., a power factor) that can be chosen to optimize the tradeoffs between a selected exhaust power and an associated selected fuel consumption. Accordingly, the controller 122 can change the value of k to place more emphasis on the effects of the selected exhaust power (e.g., by selecting a k value closer to 0) or the associated fuel consumption (e.g., by selecting a k value closer to 1). Evaluation of expression (8) is further discussed with reference to FIGS. 12-13.

At step 1120, a heater power limit is determined. For example, the controller 122, may determine, based on the prioritization made in step 1118, the heater power limit (e.g., the power to be supplied to the aftertreatment system heater 110) associated with the total required exhaust power and DDP.

At step 1122, the heater is operated according to the determined power limit. For example, the controller 122 instructs the power system 108 to provide power to the aftertreatment system heater 110 not greater than the determined power limit such that the aftertreatment system heater 110 operates at, or below, the heater power limit.

By implementing the method 1100 as described above, the controller 122 can control the power provided to the aftertreatment system heater 110 to balance various tradeoffs. For example, the controller 122 may operate to balance the tradeoff between fuel consumption and the temperature of the exhaust during a stay warm mode. As described, the controller 122 determines and/or estimates the tradeoffs based on changes in engine load and power supplied to the aftertreatment system heater 110 throughout the stay warm time. These tradeoffs are used to determine one or more heater power limits (e.g., the power supplied to the aftertreatment system heater 110) and to modify operation of the engine system 102.

Steps 1110-1122 may also be executed offline, and a corresponding lookup table programmed in the controller 122 can be used for real-time operation. In such an embodiment, a multi-dimensional lookup table based on engine speed, DDP, and total required exhaust power may be generated. Steps 1110-1122 may be executed for each combination of engine speed, DDP, and total required exhaust power, and the lookup table may be populated with the selected heater power for each combination. During real-time implementation, the inputs to the lookup table include engine speed, DDP, and total required exhaust power. An appropriate heater power limit may be selected by interpolating the lookup table by the controller 122.

Figure 12:
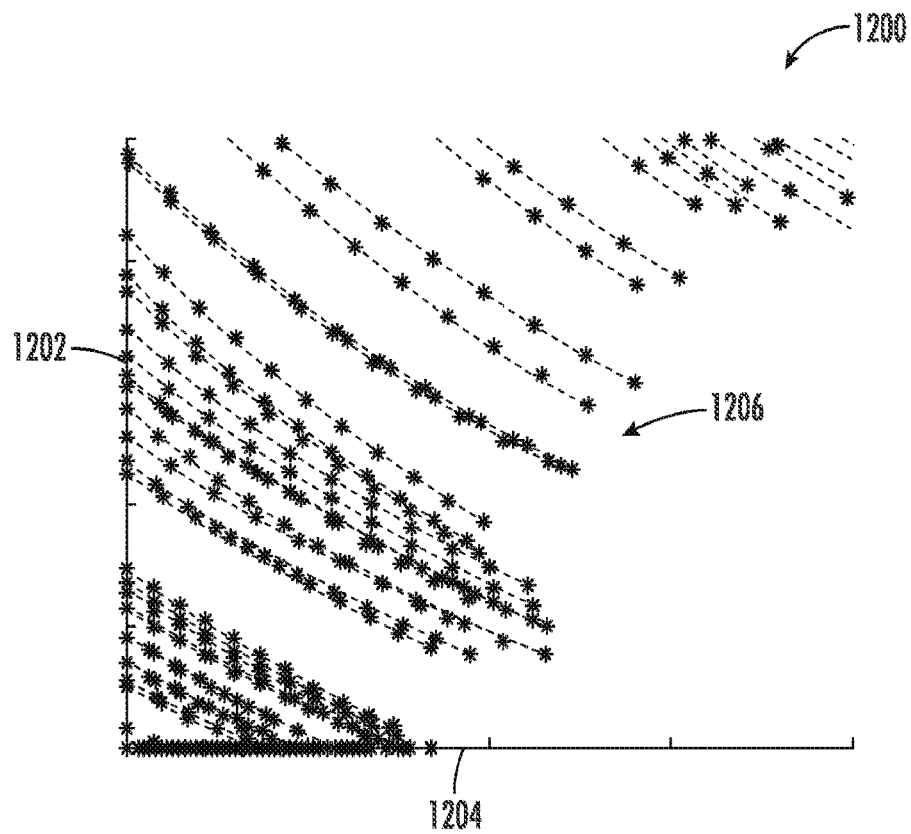
FIG. 12 is an illustration of a chart showing the relationship between fuel consumption and target heater power in a stay warm mode, according to an exemplary embodiment.

FIG. 12 is an illustration of a chart 1200 showing the relationship between fuel consumption and total required exhaust power in a stay warm mode. As shown, the chart 1200 includes a vertical axis 1202 that corresponds to the percentage deviation from the total required exhaust power (e.g., the first term in expression (8)), (e.g., the bottom-most point of the vertical axis 1202 corresponds to an actual total exhaust power that is equal to the total required exhaust power). The chart 1200 also includes a horizontal axis 1204 that corresponds to the percentage increase in fuel consumption when compared to the same vehicle operating conditions with the aftertreatment system heater 110 off (e.g., the leftmost point of the horizontal axis 1204 corresponds to a minimum fuel consumption). The chart 1200 includes various curves 1206 that each correspond to different vehicle operating conditions.

Figure 13:
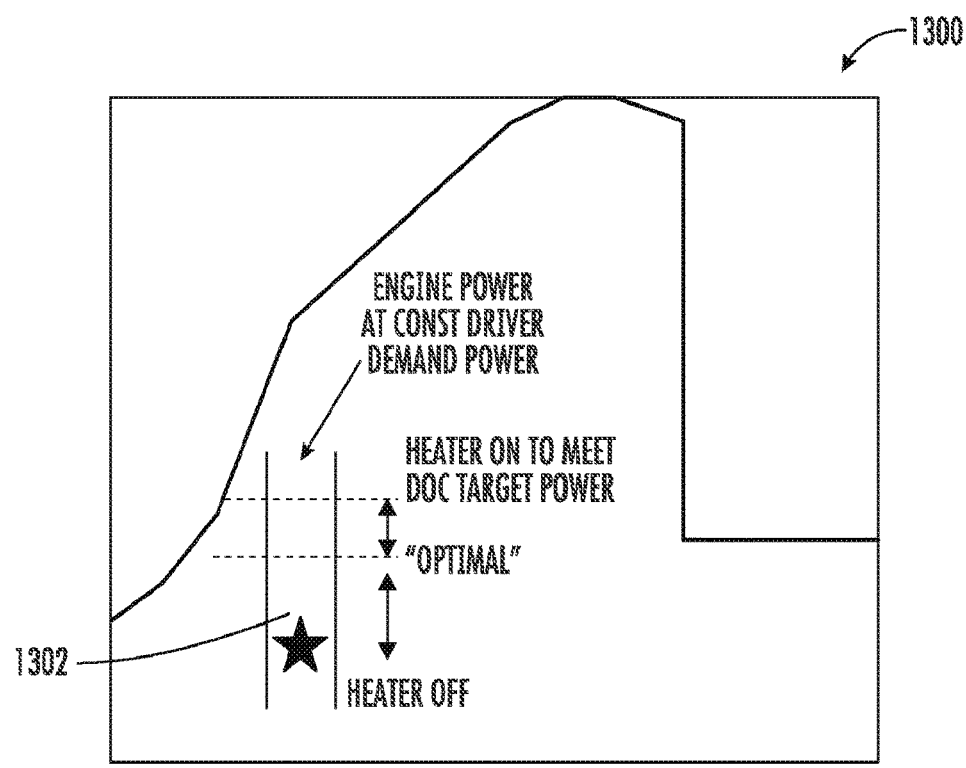
FIG. 13 is an illustration of a heater power map during a stay warm mode, according to an exemplary embodiment.

FIG. 13 is an illustration of an engine operating map 1300 during a stay warm mode, according to an exemplary embodiment. The engine operating map 1300 shows the engine brake power (in kW) on the vertical axis and engine speed (in RPM) on the horizontal axis. The engine operating map 1300 provides a specific example embodiment where a portion 1302 of the engine operating map indicates that the engine power increases with increasing heater power at constant DDP. Starting from when the heater (e.g., the aftertreatment system heater 110) is off (indicated by the star), as heater power increases, the engine power increases to meet the same DDP. Consequently, the fuel consumption also increases for the same DDP. As described with reference to FIG. 12, there is a tradeoff between the deviation from the total required exhaust power and fuel consumption. The controller 122 may determine, based on an analysis of the tradeoffs, that the amount of power that should be provided to the aftertreatment system heater 110 should be lower than the desired value to reduce fuel consumption. Accordingly, the controller 122 may instruct the power system 108 to provide enough power to the aftertreatment system heater 110 to operate the engine system 102 in the "optimal" portion of the engine operating map 1300.

Figure 14:
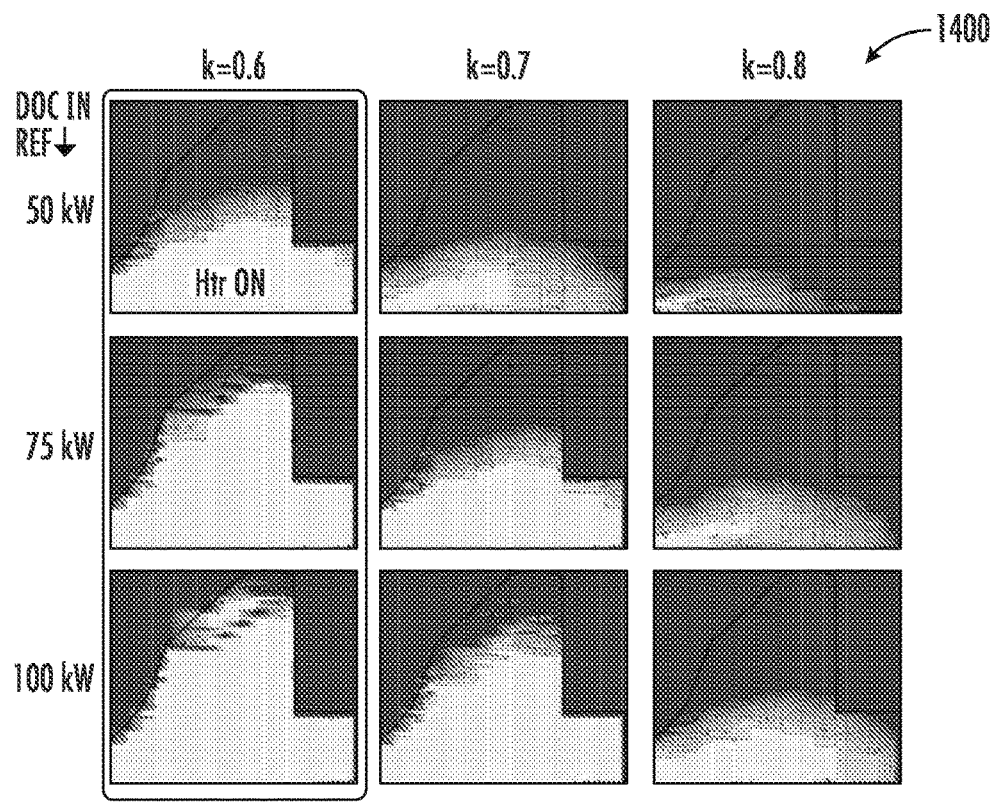
FIG. 14 is an illustration of various heater power maps in a stay warm mode, according to an exemplary embodiment.

FIG. 14 is an illustration of various heater power maps 1400 in a stay warm mode, according to an exemplary embodiment. As shown, each of the individual heater maps shows how power is distributed to the aftertreatment system heater 110 at various engine speeds and DDPs based on the target heater power and a constant value of k from expression (5). The lighter portions of the heater power maps correspond to the aftertreatment system heater 110 being on, with the lightest portion corresponding to the aftertreatment system heater 110 being fully powered and the darkest portion corresponding to the aftertreatment system heater 110 being off. The various shades in between correspond to the aftertreatment system heater 110 having partial power (e.g., less than the target amount of power). As shown, as the target heater power increases the aftertreatment system heater 110 must be on in more instances as compared to a lower target heater power. Furthermore, as k increases, the relative value placed on fuel consumption increases, indicating that fuel consumption is a greater consideration than a temperature of the exhaust gas. Accordingly, as k increases the aftertreatment system heater 110 is operational in fewer instances. As k decreases, the relative value placed on the temperature of the exhaust gas increases, indicating that the temperature of the exhaust gas is a greater consideration than fuel consumption.

Figure 15:
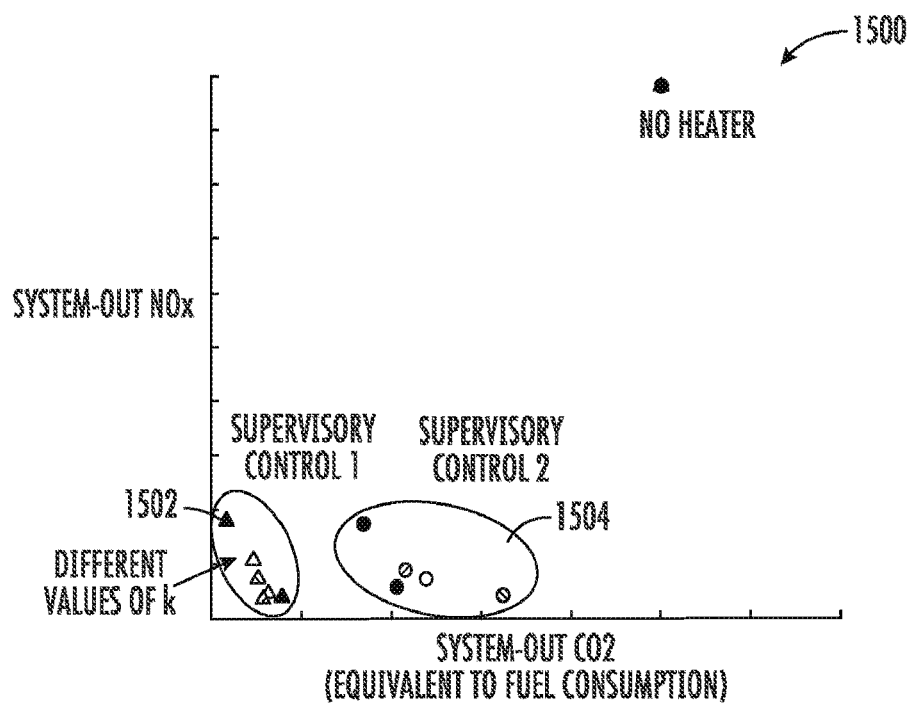
FIG. 15 is an illustration of chart 1500 showing a relationship between emissions and fuel consumption under different control paradigms.

FIG. 15 is an illustration of chart 1500 showing a relationship between emissions and fuel consumption under different control paradigms. The chart 1500 shows the relationship between emissions at the output of the aftertreatment system 150 on the vertical axis and fuel consumption on the horizontal axis. As shown, the chart 1500 includes a first control paradigm 1502 and a second control paradigm 1504. The first control paradigm 1502 and the second control paradigm 1504 may be embodied as controllers (e.g., similar to the controller 122) such that each controls the operation of an engine system. The control paradigms correspond to different control strategies that determine the required additional exhaust power at any time instant. In each control paradigm, different values of k yield different results of emissions and fuel consumption.

Though the systems and methods described above were described relative to a single mode of operation (e.g., a cold start mode or a stay warm mode), any of the methods described above may be used for either of the engine operating modes discussed. For example, the methods described with reference to FIGS. 3-5 can be used during a stay warm mode, and the methods described with reference to FIG. 11 can be used during a cold start mode.

Furthermore, the systems and methods described above can more generally be used to control power provided to the aftertreatment system heater 110 to balance engine performance against various other catalyst performance measures. Example of such measures include, but are not limited to, DPF regeneration (e.g., regenerating the diesel particulate filter by passing exhaust gas at a high temperature through the DPF), SCR desulfation (e.g., removing sulfur oxides by passing high temperature exhaust gas through the SCR), etc.

In an additional embodiment, the aftertreatment system heater 110 is used during deceleration and or braking of the engine system 102. Conventionally, when the vehicle 100 is decelerating and/or braking, the kinetic energy of the vehicle 100 is absorbed through the mechanical brakes. The kinetic energy is eventually converted to heat energy, which is dissipated and lost into the environment. In other instances, "engine braking" or "compression braking" is used to decelerate the engine system 102, wherein the engine system 102 applies a negative torque on the drivetrain.

In some embodiments the aftertreatment system heater 110 is operated at, or below, the heater power limit when the vehicle 100 is braking or decelerating. Operating the aftertreatment system heater 110 in the manner described increases the power absorbed by the motor-generator from the driveshaft, which can aid deceleration of the vehicle 100. A portion of the kinetic energy of the vehicle 100 is therefore converted to thermal energy which is then delivered to the aftertreatment system 150.

Operating the aftertreatment system heater 110 as described during braking or deceleration of the vehicle 100 provides various advantages. One advantage is that, instead of losing the vehicle kinetic energy during braking or decelerating, the kinetic energy is converted into thermal energy which is transferred to the aftertreatment system 150. Furthermore, braking and decelerating events conventionally tend to decrease the temperature of the exhaust gas because the engine system 102 is spinning without any fuel being introduced. Operating the aftertreatment system heater 110 at, or below, the heater power limit as described can result in maintaining, or increasing, the temperature of the exhaust gas even during braking or deceleration events.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2 it should be understood that the controller 122 may include any number of circuits for completing the functions described herein. For example, the activities and functionalities of the circuits 232-236 may be combined in multiple circuits or as a single circuit. Additional circuits with additional functionality may also be included. Further, the controller 122 may further control other activity beyond the scope of the present disclosure.

As mentioned above and in one configuration, the "circuits" may be implemented in machine-readable medium for execution by various types of processors, such as the processor 212 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A method for increasing a temperature of an exhaust gas of a vehicle to a target temperature, the method comprising:
    determining, by a controller, a target energy of the exhaust gas;
    determining, by the controller, a target emissions based at least on the target energy and a cumulative emissions over a certain time interval and up to a current instant;
    determining, by the controller, a tradeoff in a performance of an engine corresponding to one or more of the target emissions, an engine speed, and a driver demand power;
    determining, by the controller, an allowable heater power based at least on the tradeoff and the target emissions; and
    operating, by the controller, a heater downstream from the engine with a heater power command not exceeding the allowable heater power to heat the exhaust gas to the target temperature.

2. The method of claim 1, wherein the target energy is determined based on an energy amount for the exhaust gas to reach the target temperature.

3. The method of claim 1, further comprising:
    determining, by the controller, a state of charge of a battery of the vehicle;
    determining, by the controller, that the state of charge is above a threshold; and
    operating, by the controller, the heater to heat the exhaust gas to the target temperature in response the state of charge being above the threshold.

4. The method of claim 1, further comprising:
    receiving, by the controller, an emissions level of the vehicle;
    determining, by the controller, that the emissions level is above a threshold; and
    operating, by the controller, the heater to heat the exhaust gas to the target temperature in response to the emissions level being above the threshold.

5. The method of claim 1, further comprising:
    determining, by the controller, a warm up time for a catalyst to reach the target temperature;
    determining, by the controller, a total required exhaust power of the exhaust gas; and
    determining, by the controller, the target emissions based on one or more of the warm up time and an exhaust target power.

6. The method of claim 1, further comprising: directing, by the controller, kinetic energy recovered during a vehicle braking or deceleration event to the heater.

7. The method of claim 1, further comprising:
    operating, by the controller, the heater of an aftertreatment system at or below a heater power limit when the vehicle is braking or decelerating.

8. A system for increasing a temperature of an exhaust gas in a vehicle with an engine, the system comprising:
    an aftertreatment system coupled to the engine;
    an aftertreatment system heater in communication with the aftertreatment system; and
    a controller in communication with the engine and the aftertreatment system heater, the controller comprising a processor coupled to a non-transitory memory storing instructions that, when executed by the processor, cause the controller to perform operations comprising:
        determining a target energy of the exhaust gas;
        determining a target emissions based on at least the target energy and a cumulative emissions over a certain time interval and up to a current instant;
        determining a tradeoff in a performance of the engine corresponding to one or more of the target emissions, an engine speed, and a driver demand power;
        determining an allowable heater power based at least on the tradeoff and the target emissions; and
        operating the aftertreatment system heater with a heater power command not exceeding the allowable heater power to heat the exhaust gas to a target temperature or maintain the exhaust gas at the target temperature.

9. The system of claim 8, wherein the target energy is determined based on an energy amount for the exhaust gas to reach the target temperature.

10. The system of claim 8, the operations further comprising:
  determining a state of charge of a battery of the vehicle;
  determining that the state of charge is above a threshold; and
  operating the aftertreatment system heater to heat the exhaust gas to the target temperature in response the state of charge being above the threshold.

11. The system of claim 8, the operations further comprising:
  receiving an emissions level regarding operation of the vehicle;
  determining that the emissions level is above a threshold d; and
  operating the aftertreatment system heater to heat the exhaust gas to the target temperature in response to the emissions level being above the threshold.

12. The system of claim 8, the operations further comprising:
  determining a warm up time for a catalyst to reach the target temperature;
  determining a total required exhaust power of the exhaust gas; and
  determining the target emissions based on one or more of the warm up time and the total required exhaust power.

13. The system of claim 8, the operations further comprising:
  directing kinetic energy recovered during a vehicle braking or deceleration event to the aftertreatment system heater.

14. The system of claim 13, the operations further comprising:
  operating the aftertreatment system heater at or below a heater power limit when the vehicle is braking or decelerating.

15. A method for maintaining a temperature of an exhaust gas in a vehicle within a predetermined range, the method comprising:
  determining, by a controller, a total required exhaust power of the exhaust gas to maintain the temperature of the exhaust gas;
  determining, by the controller, a tradeoff in fuel consumption of an engine corresponding to one or more of the total required exhaust power, an engine speed, and a driver demand power;
  determining, by the controller, a target emissions based at least on a cumulative emissions over a certain time interval and up to a current instant;
  determining, by the controller, an allowable heater power based at least on the tradeoff and the target emissions; and
  operating, by the controller, an aftertreatment system heater with a heater power command not exceeding the allowable heater power to maintain the temperature of the exhaust gas.

16. The method of claim 15, further comprising:
  determining that a temperature of the engine is above a predefined threshold; and
  performing the method in response to the temperature of the engine being above the predefined threshold.

17. The method of claim 15, further comprising:
  determining, by the controller, a required additional exhaust power to maintain the temperature of the exhaust gas based on the temperature of the exhaust gas;
  determining, by the controller, an instantaneous exhaust power based on an instantaneous exhaust gas temperature and an exhaust gas flow rate; and
  determining, by the controller, the total required exhaust power based on the required additional exhaust power and the instantaneous exhaust power.

18. The method of claim 17, further comprising:
  generating, by the controller, a heater power array including a zero heater power level, a maximum heater power level, and one or more heater power levels between the zero heater power level and the maximum heater power level;
  determining, by the controller, a fuel consumption amount corresponding to each heater power level;
  determining, by the controller, a priority between an exhaust power and the fuel consumption of the engine based on the fuel consumption corresponding to each heater power level;
  determining, by the controller, an allowable heater power based on the priority between the exhaust power and the fuel consumption; and
  operating, by the controller, the aftertreatment system heater with the heater power command not exceeding the allowable heater power to maintain the temperature of the exhaust gas.

19. The method of claim 15, further comprising:
  receiving, by the controller, an emissions level of the vehicle;
  determining, by the controller, that the emissions level is above a threshold; and
  operating, by the controller, the aftertreatment system heater to heat the exhaust gas to the target temperature in response to the emissions level being above the threshold.

20. The method of claim 15, further comprising:
  determining, by the controller, a state of charge of a battery of the vehicle;
  determining, by the controller, that the state of charge is above a threshold; and
  operating, by the controller, the aftertreatment system heater to heat the exhaust gas based on the state of charge being above the threshold.

* * * * *